L. G. DANIELS.
MULTIPLE SPINDLE TURRET LATHE.
APPLICATION FILED APR. 13, 1916.
1,274,859.
Patented Aug. 6, 1918.
10 SHEETS-SHEET 1.
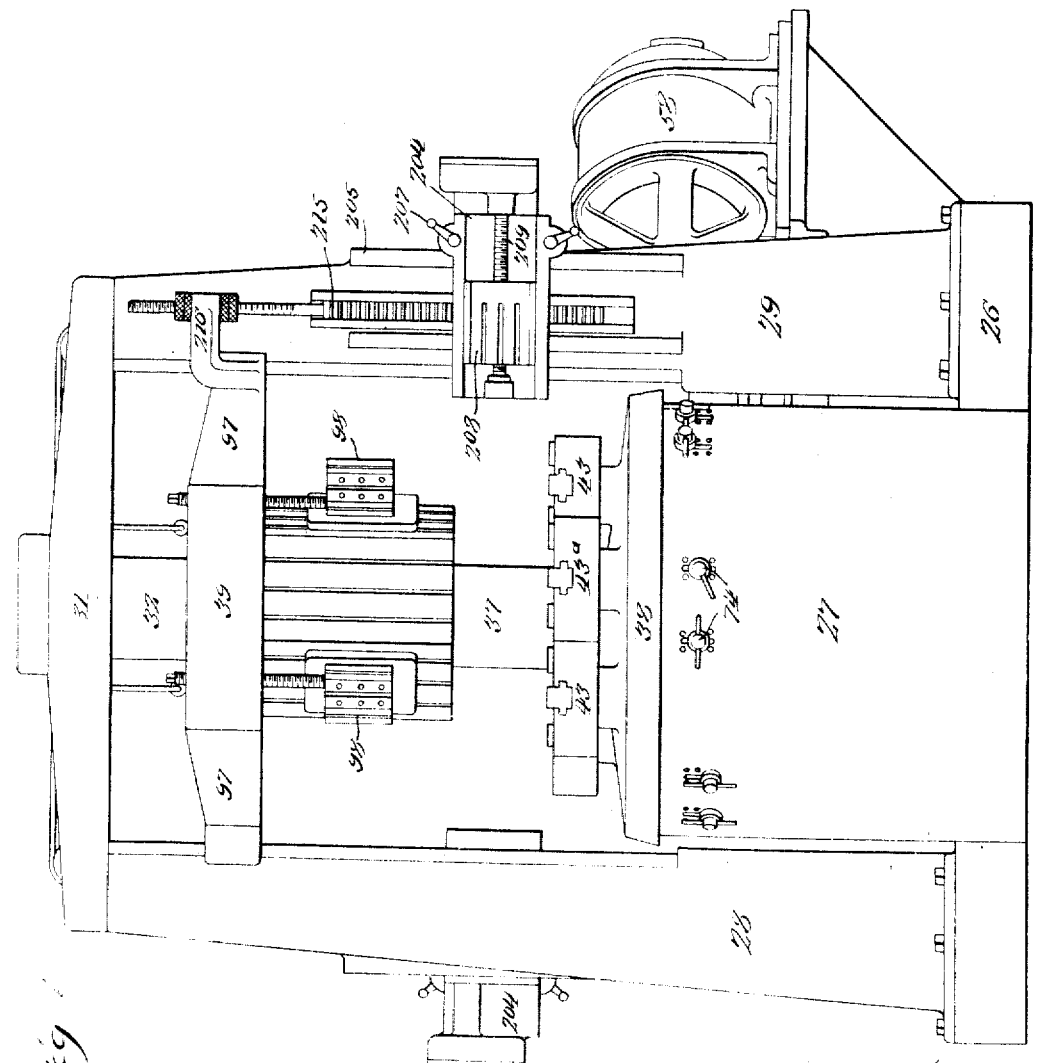
Inventor:
Lee G. Daniels
by Pond & Wilson
Attys L. G. DANIELS.
MULTIPLE SPINDLE TURRET LATHE.
APPLICATION FILED APR. 13, 1916.
1,274,859.
Patented Aug. 6, 1918.
10 SHEETS—SHEET 2.
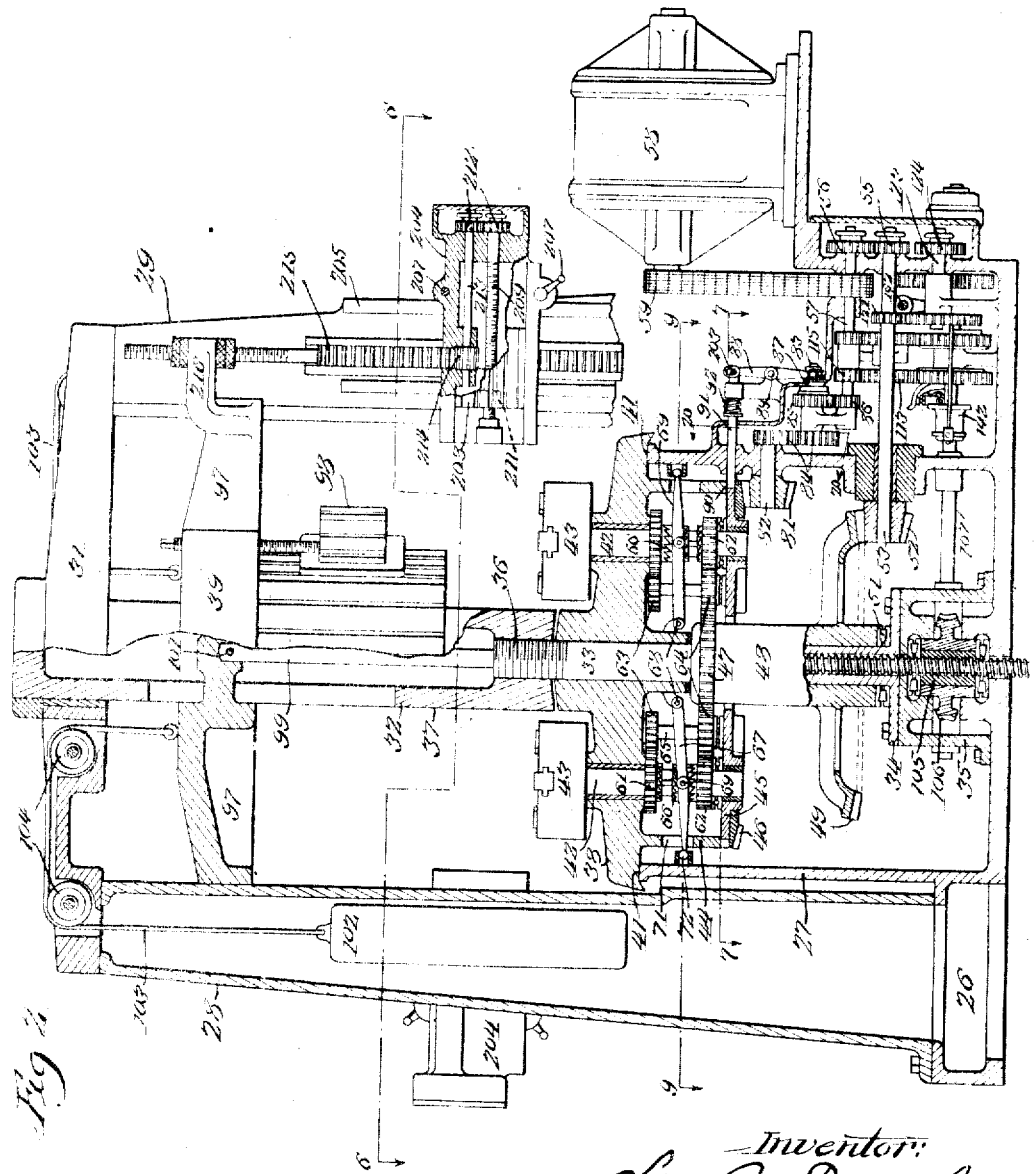
Inventor:
Lee G. Daniels
By Pond & Wilson
Attys.

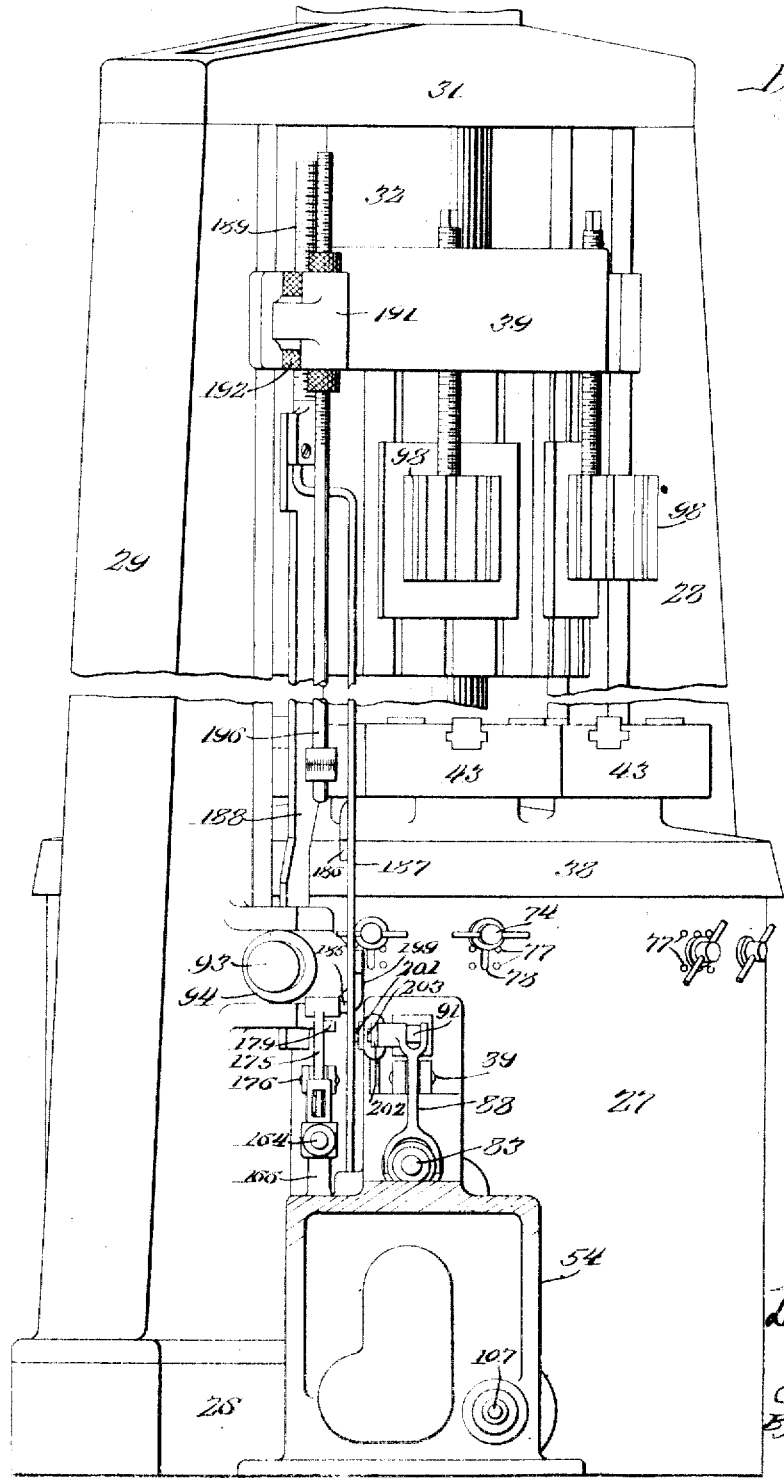

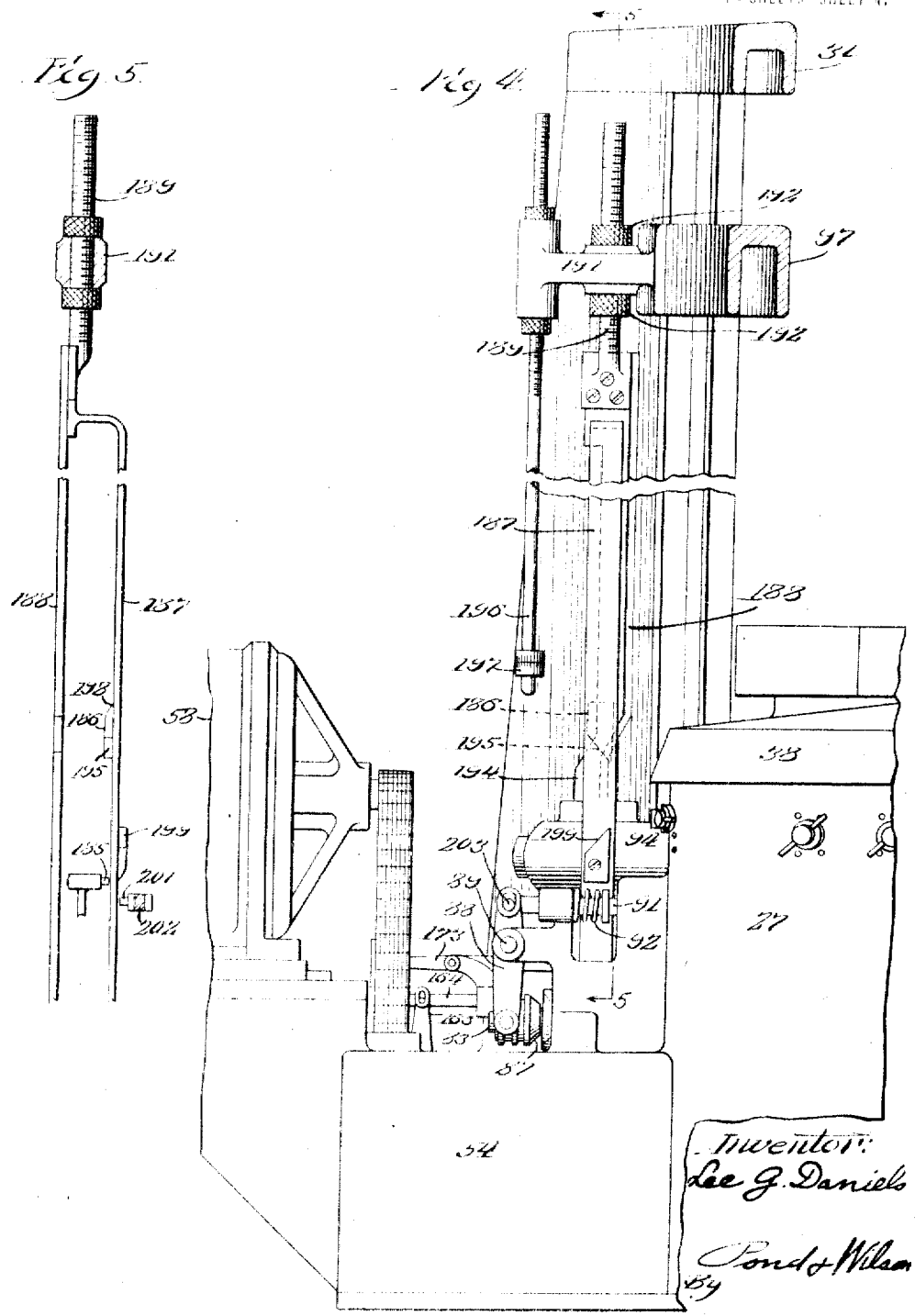

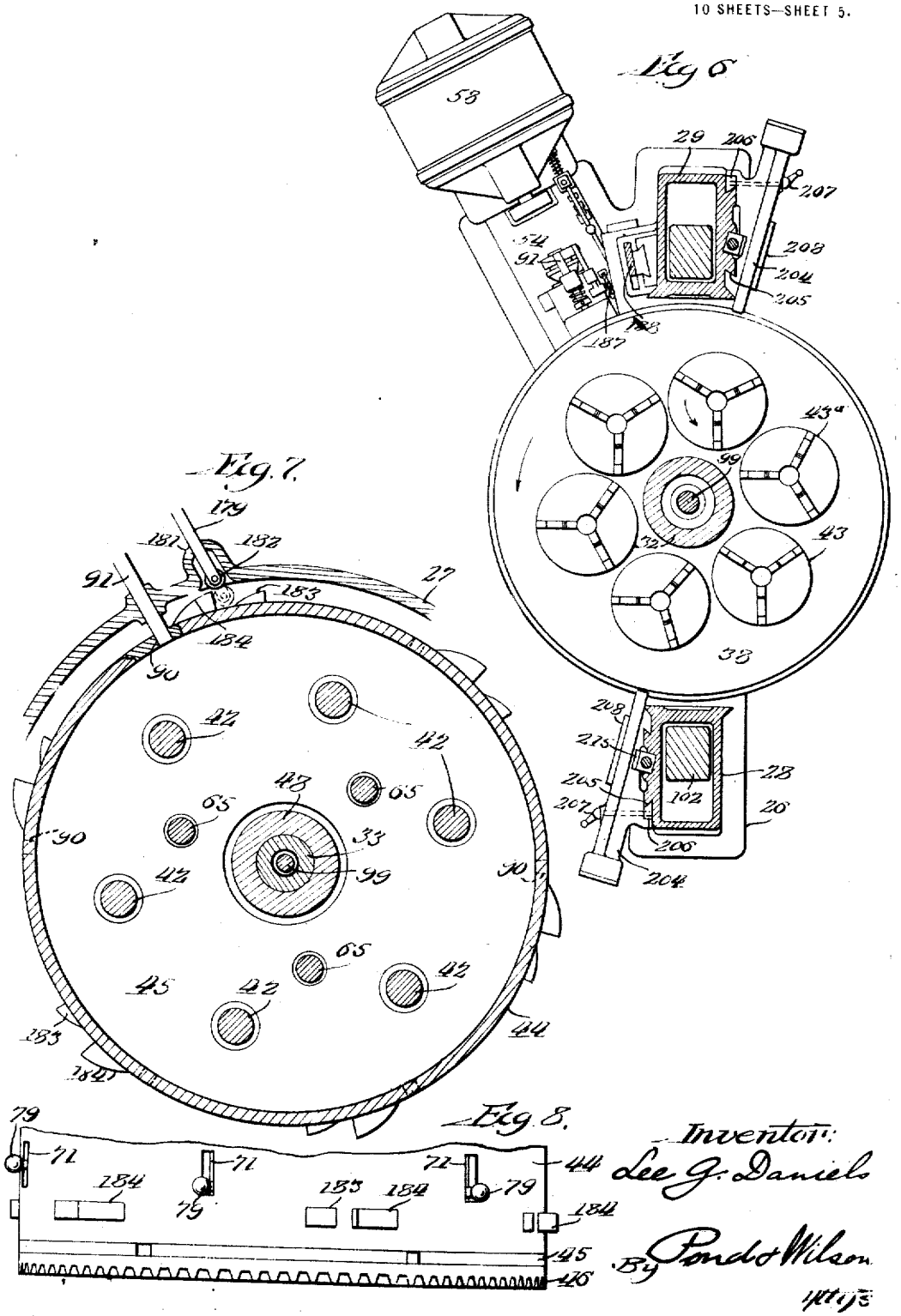

L. G. DANIELS.
MULTIPLE SPINDLE TURRET LATHE.
APPLICATION FILED APR. 13, 1916.
1,274,859.
Patented Aug. 6, 1918.
10 SHEETS—SHEET 6.
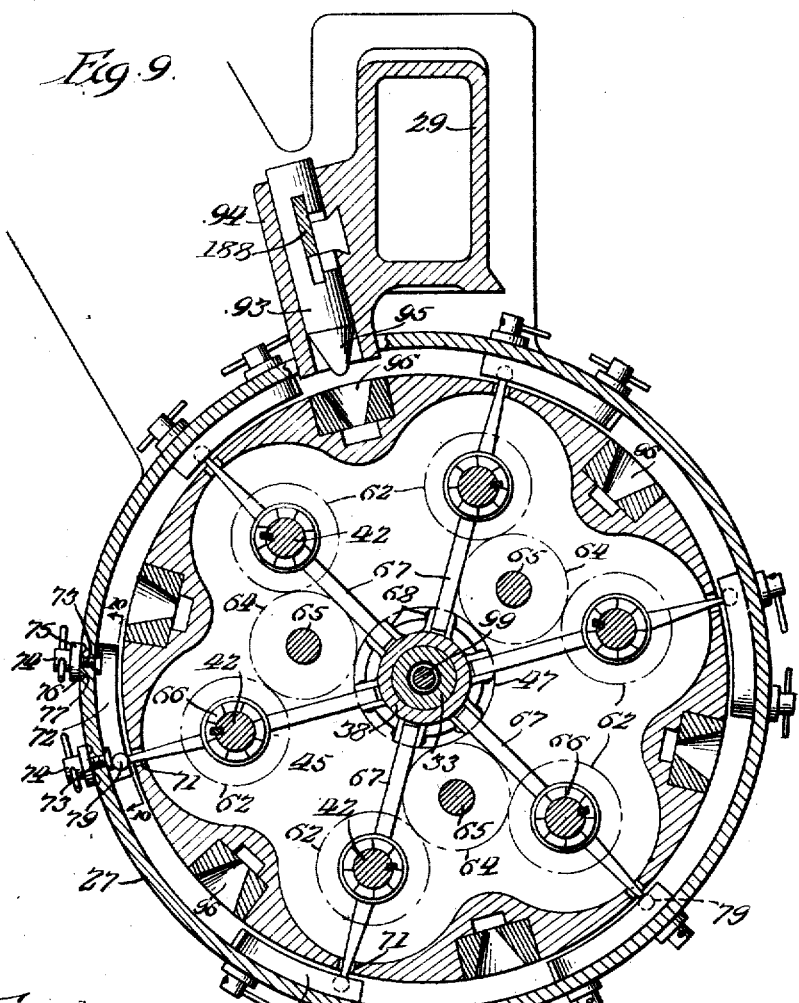
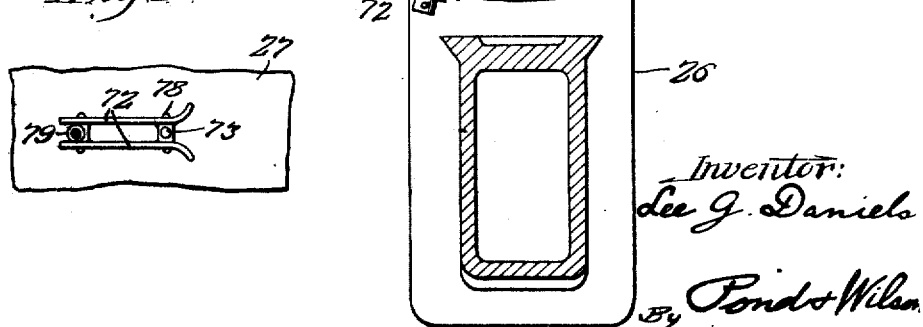
Inventor:
Lee G. Daniels
By Pond & Wilson
Attys.

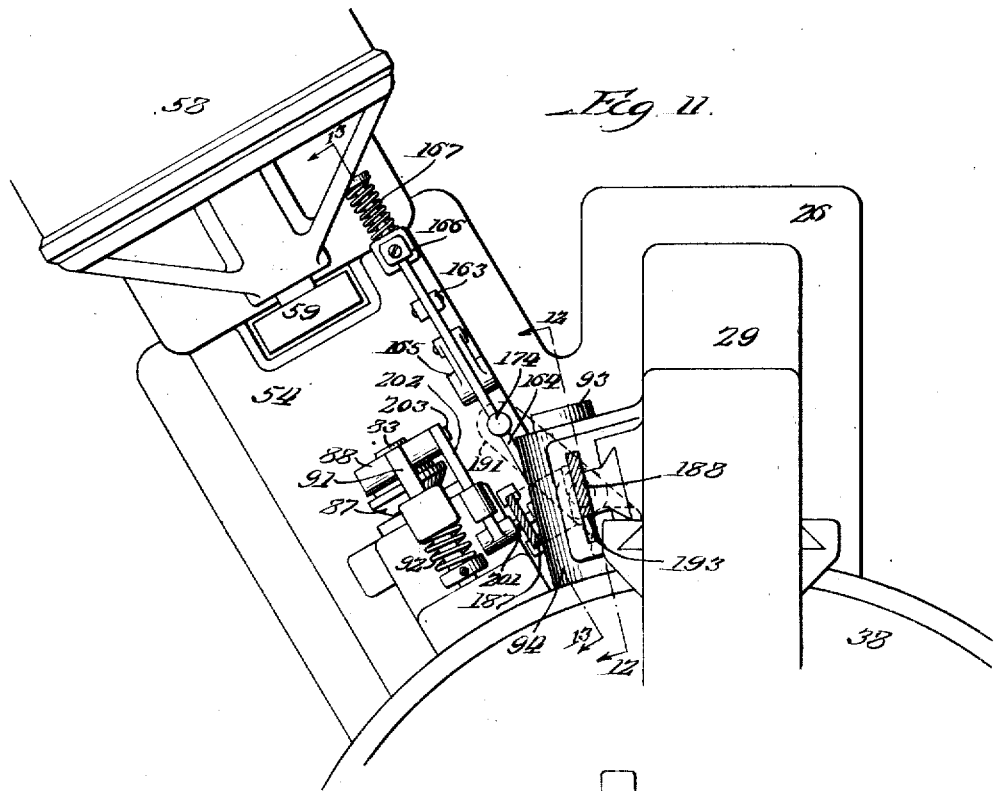
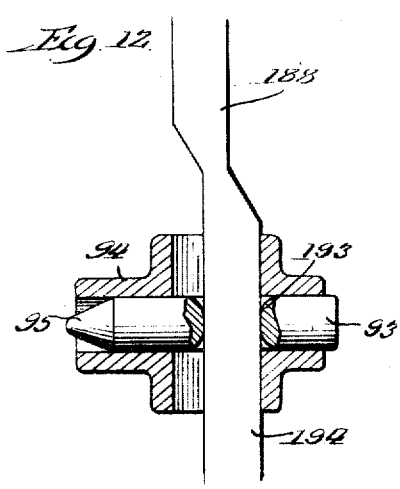
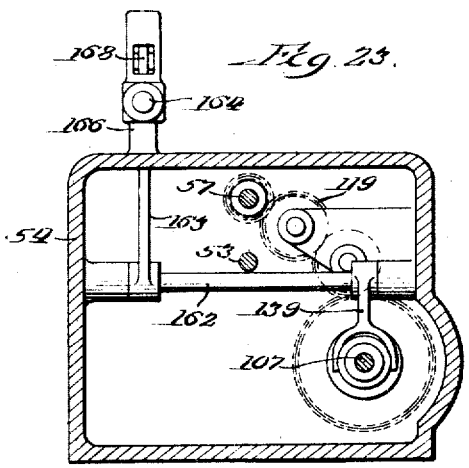

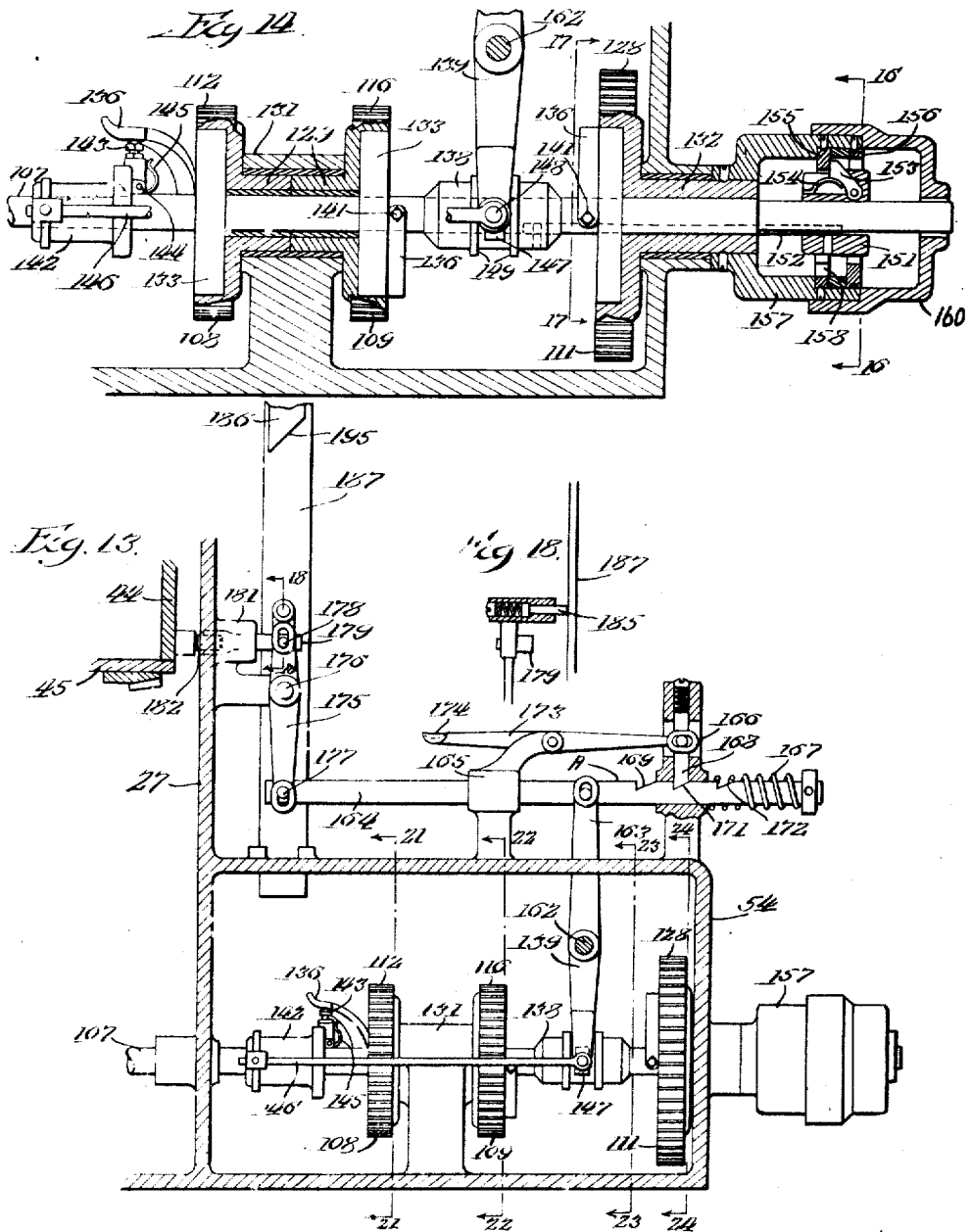

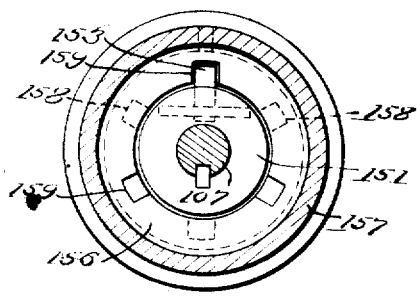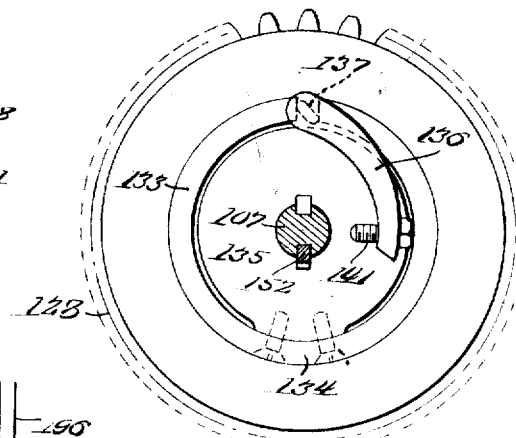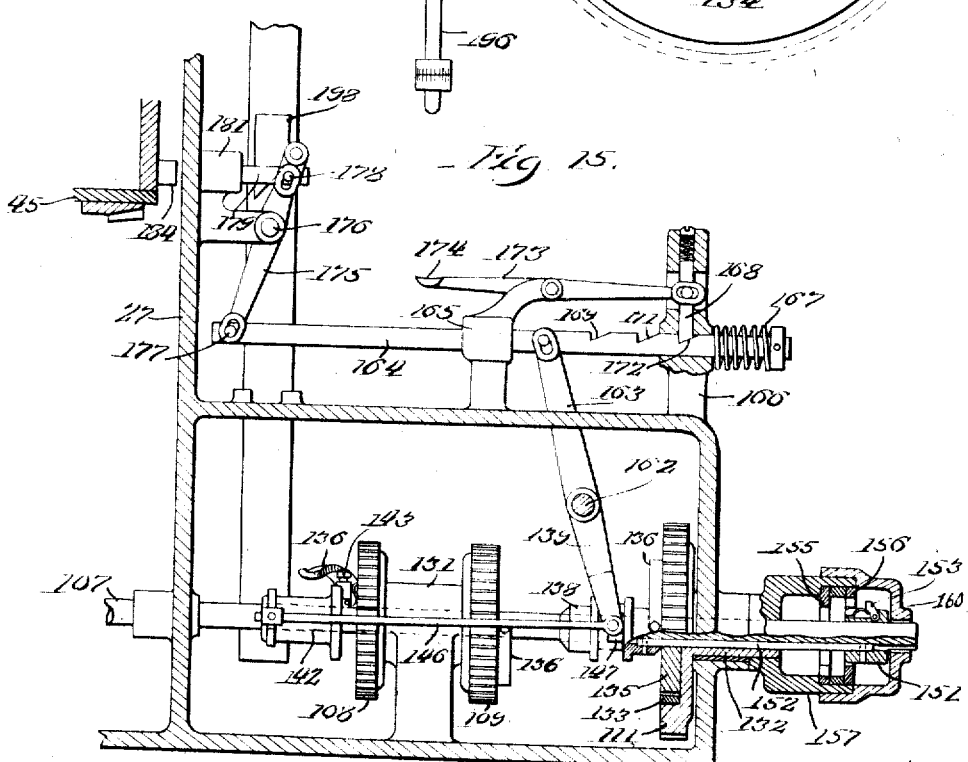

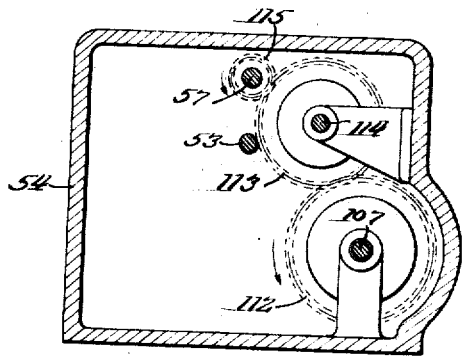
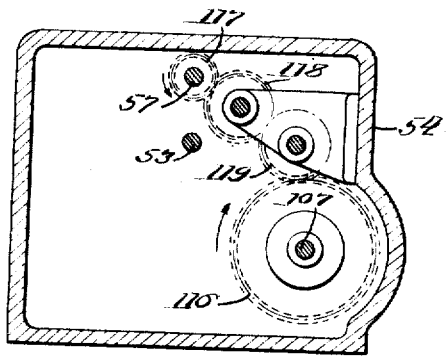
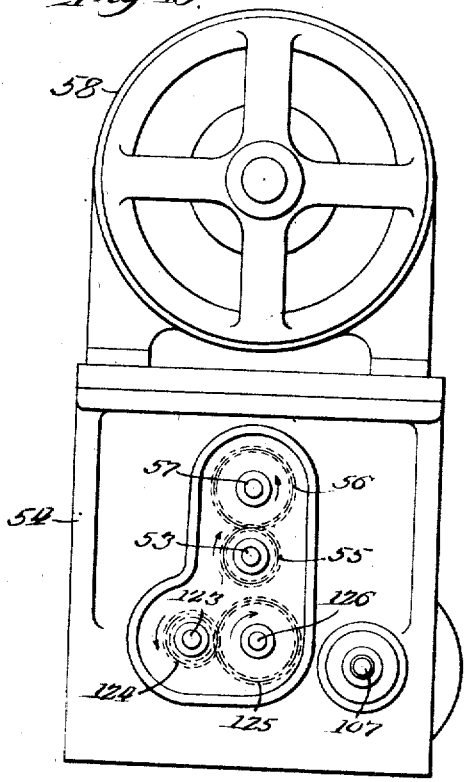
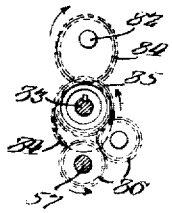
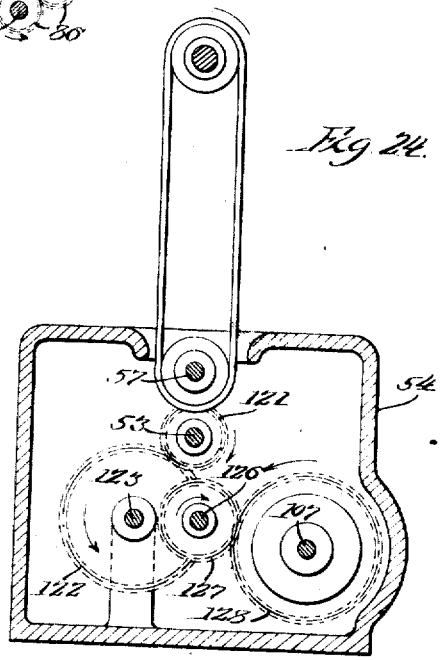

UNITED STATES PATENT OFFICE.

LEE G. DANIELS, OF ROCKFORD, ILLINOIS.

MULTIPLE-SPINDLE TURRET-LATHE.

1,274,859.  Specification of Letters Patent.  Patented Aug. 6, 1918.

Application filed April 13, 1916. Serial No. 90,940.

*To all whom it may concern:*

Be it known that I, LEE G. DANIELS, a citizen of the United States, residing at Rockford, in the county of Winnebago and State of Illinois, have invented certain new and useful Improvements in Multiple-Spindle Turret-Lathes, of which the following is a specification.

This invention relates in general to the art of metal working tools, and has more particular reference to automatically controlled multiple spindle turret lathes of the station type. Within this type my invention has special reference to lathes characterized by the provision of a plurality of work-carrying spindles or chucks mounted on a work carrier adapted to be rotated in step by step movements to various stations, such as loading and working stations, and a tool carrier adapted to be brought into and out of operation with respect to the work at each station, the arrangement being such that as the work is moved from station to station each tool or set of tools in a tool holder successively perform a plurality of operations thereon. It is desirable to operate the work and tool carrying devices in predetermined timed relation and sequence by automatic control mechanism so that accuracy and precision in operation is obtained as well as uniformity and expedition.

My invention therefore aims, primarily, to provide an improved multiple turret lathe of the character described embodying automatic mechanism for effectively controlling and operating the work and tool carrying devices with a view to accuracy, uniformity and despatch.

Another important object of my invention is to provide automatic control mechanism, comparatively simple in design and operation as compared with the complex, intricate and involved mechanisms that have heretofore been provided for analogous purposes. In this connection my improvements not only enable production of machines of this character at considerably less cost than has been heretofore possible, but due to simplicity of the design, the various adjustments necessary to effect accuracy in cutting may be easily and quickly obtained and the liability of derangements or improper working is reduced to a minimum.

In carrying into effect these general objects, I have devised, and my invention contemplates, various improvements, generally stated, as follows:

One feature of improvement resides in an improved work carrier and indexing mechanism together with novel means for operating and controlling the work-carrying spindles or chucks of the work carrier and for controlling the indexing mechanism. The indexing mechanism is rendered very simple and effective by the embodiment therein of a pair of elliptical gears which gradually accelerate the rotative movement of the work carrier when indexing and then gradually check its momentum to bring it to a stop without jar or excessive strain on the mechanism. Also, the spindle driving means contains novel features, consisting in the manner of establishing a drive between each spindle and a central gear including a clutch device whereby any spindle may be driven at one of a plurality of different speeds or stopped as determined by a novel control mechanism for operating the clutches.

Another feature resides in the provision of improved means for moving the tool carrier toward and from the work carrier to bring the tools into and out of operation, said means consisting of a tool carrier slidably mounted on a center column and guided by a side column and a member disposed within the center column coöperating with the tool carrier and operable to shift the same axially on the column.

Another feature consists in the provision of novel mechanism for controlling the movements of the tool carrier. This mechanism operates the tool carrier to obtain first a rapid traverse or approach movement to quickly bring the tools into close proximity to the work, then a slower or feed movement during which the actual cutting is performed, then an arrest of this feed and a brief stationary condition of the tool carrier at the completion of the cutting operation to remove tool marks and smooth the cut surfaces, and finally a rapid retracting or reverse movement of the tool carrier. This mechanism includes a plurality of clutch devices continuously driven and adapted to be independently connected to driven members to effect certain of the movements mentioned. An automatic control is provided for operating the clutches in proper sequence. This clutch mechanism and automatic control therefor as embodied in a multiple spindle lathe contains many novel features as will be apparent hereinafter.

My invention also contemplates the provision in combination with a work carrier and tool carrier, one of which is adapted to be indexed, that is, rotated in step by step movements to different stations, and one of which is reciprocable to bring the tools into and out of operation, and mechanisms for indexing the rotary carrier and reciprocating the reciprocable carrier, of automatic control mechanism governing the operation of said indexing and feed mechanisms and being itself actuated through the rotary and reciprocating movements of said mechanisms. By utilizing the movements of these mechanisms to actuate the control devices, I am enabled to provide a control mechanism of comparatively few parts and of simple construction considering the work accomplished thereby. In respect to this automatic control mechanism, I have endeavored to provide the simplest and most efficient and practical means for effecting the desired results. In furthering this end, I have interrelated the feed mechanism control with the indexing mechanism control and have taken advantage of certain movements of various inherently necessary parts of the machine to actuate or put into operation these control mechanisms.

A further feature in connection with the automatic control is the employment of sliding or traveling cams that are connected directly to the reciprocable tool carrier and function to put the control mechanism into and out of operation in a novel manner.

Still another feature lies in the provision of one or more lateral-feed tool carriers, that is, carriers operating in a plane at right angles to the cross-feed of the principal tool carrier and in a novel manner operated by movement of the latter tool carrier.

These and other objects and advantages will be apparent as the invention becomes better understood by reference to the following description when considered in connection with the accompanying drawings in which—

Figure 1 is an elevation of a multiple spindle turret lathe embodying my improvements;

Fig. 2 is a fragmentary vertical sectional view through the lathe with certain parts shown in elevation;

Fig. 3 is an end elevation of the control end of the lathe, the motor and lateral feed tool carriers being omitted;

Fig. 4 is a side elevation of the control end of the lathe taken from the side opposite that shown in Fig. 1;

Fig. 5 is a detail sectional view taken substantially on the line 5—5 of Fig. 4;

Fig. 6 is a plan sectional view taken substantially on the line 6—6 of Fig. 2;

Fig. 7 is a fragmentary plan sectional view taken substantially on the line 7—7 of Fig. 2;

Fig. 8 is an elevation of the lower end of the work carrier shown in Fig. 7;

Fig. 9 is a plan sectional view taken substantially on the line 9—9 of Fig. 2;

Fig. 10 is a detail sectional view taken on the line 10—10 of Fig. 9;

Fig. 11 is an enlarged plan view, partially in section, of the control end of the lathe;

Fig. 12 is a detail sectional view taken on the line 12—12 of Fig. 11;

Fig. 13 is a vertical sectional view through the control mechanism taken substantially on the line 13—13 of Fig. 11, showing the parts in position with the rapid approach in operation;

Fig. 14 is an enlarged vertical sectional view through the clutch mechanism shown in Fig. 13;

Fig. 15 is a sectional view similar to Fig. 13, but with the parts moved to feed position and certain of the mechanism being broken away;

Figs. 16 and 17 are cross-sectional views through the control mechanism taken on the lines 16—16 and 17—17, respectively, of Fig. 14.

Fig. 18 is a detail sectional view taken substantially on the line 18—18 of Fig. 13;

Fig. 19 is an end elevation of the control mechanism housing and motor;

Fig. 20 is a detail taken substantially on the line 20—20 of Fig. 2; and

Figs. 21, 22, 23 and 24 are cross-sectional views through the control mechanism taken on the lines 21—21, 22—22, 23—23, and 24—24, respectively of Fig. 13.

In carrying my improvements into effect, I have, for purpose of illustration, chosen to embody the same in a multiple spindle turret lathe of the upright type, that is, in which the spindles are vertically disposed, and it should be understood that my invention contemplates also the embodiment of these improvements in a lathe of the horizontal spindle type or in a metal working machine of an analogous character.

Referring especially to Figs. 1 and 2 of the drawings, it will be observed that the frame of the lathe consists of a base, designated in general by reference character 26, having formed centrally thereon an upright cylindrical housing 27, upright standards or columns 28 and 29 secured to the base on diametrically opposite sides of the housing 27 and a cross-head 31 fixedly binding together the upper ends of the side columns. A central upright column, designated in general by reference character 32, disposed concentric with the cylindrical housing 27 is secured at its upper and lower ends, respectively, to the cross head 31 and base 26 and provides a pivot about which a work carrier rotates and a vertical guideway upon which a tool carrier is slidably mounted. In the present instance, this column 32 consists of a tubular post 33 that has a flanged lower end 34 bolted to a housing 35, which in turn is bolted to the base 26, and has threaded engagement at its upper end 36 with the guideway portion 37 that is of greater diameter than the post 33 and is suitably anchored at its upper end in the cross-head 31.

The work carrier and tool carrier referred to, designated in general by reference characters 38 and 39, are mounted on the central column portions 33 and 37 respectively, so that the work carrier is rotatable thereon and the tool carrier reciprocable vertically to bring its tools into and out of operative relation to the work on the work carrier. The construction and operation of the carriers and the mechanism for automatically operating and controlling the same to automatically effect operation thereof *seriatim* will now be described, taking first the work carrier and its operating mechanism.

Referring particularly to Figs. 2 and 9, the work carrier 38, in the form of a horizontally disposed table centrally journaled on the post 33 and having a peripheral bearing 41 on the top of the housing 27, carries a plurality of circumferentially spaced vertical spindles 42 constituting the work-carrying elements suitably journaled in the carrier. In the present instance, the spindles are each equipped with a chuck 43 of a multiple-jaw type well known in this art. The work-carrier has a depending annular flange or wall 44 spaced within the housing 27 to the lower end of which is secured a bottom wall 45 which in turn carries a circumferential rack 46. In the compartment formed by the walls 44 and 45 is disposed mechanism for driving the spindles 42, which will now be described.

A central drive gear 47 disposed within the said compartment co-axial with the work carrier is adapted to be continuously driven while the machine is in operation. In the present instance, the gear 47 is fixedly secured to the upper end of an elongated hub 48 of a bevel gear 49 that is loosely journaled on the post 33 intermediate the flange 34 and work carrier 38 and mounted at its lower end on an anti-friction thrust bearing 51. This bevel gear meshes with a pinion 52 fixed to a shaft 53 journaled at one end in the wall of the housing 27 and at its opposite end in the end of the wall of the housing 54 that incases a control mechanism to be described hereinafter. The shaft 53 is in continuous driving connection through the intermediary of spur gears 55 and 56 with a drive shaft 57 journaled in the housing 54 and adapted to be continuously driven by suitable means, such for instance as by an electric motor 58 through the agency of a silent link chain 59. Loosely mounted on each spindle 42 and suitably held in spaced relation are a pair of spur gears 61 and 62 adjacent pairs of which are in mesh with a pair of gears 63 and 64 respectively, fixedly secured to a shaft 65 journaled in the work carrier intermediate the spindles of alternate pairs. The gears 64 are in mesh with the central gear 47 so that a positive driving connection is established between the central gear 47 and the gears 61 and 62 on the spindles. Means are provided for independently connecting each of the gears 61 and 62 to its respective spindle to rotate the same, the said gears 61 and 62 being of different diameters as also the intermediate gears 63 and 64 so that the spindle may be driven at different speeds. The means for effecting said connection comprises an independent clutch on each spindle adapted to connect either gear to the spindle and to be disconnected from both so that the spindle may be out of driving connection with the central gear and thus remain idle. The clutch illustrated is of a well known positive grip type consisting of a member 66 splined to the spindle and provided with toothed faces adapted to engage respectively with the toothed faces of the gears 61 and 62 when the said member is slid axially on the spindle in opposite directions. Each sliding clutch is adapted to be shifted by an independent lever 67 pivotally mounted at 68 on a central portion of the work carrier and connected at 69 to the sliding element 66 of the clutch and extended radially through an aperture 71 in the wall 44 so as to be shiftable by stationary cam means mounted on the interior wall of the housing 27. This cam means, best shown in Figs. 9 and 10, is adapted to control the clutch levers 67 at each station. In other words, stationary cams are provided with which the cam levers 67 coöperate and by which they are actuated, to maintain the clutches in predetermined positions at the several stations of the work carrier. These cams are adjustable to either of three positions in which to effect either of two driving speeds of the spindles or non-rotation thereof. For purposes of illustration, I have shown an independent cam at each station comprising vertically spaced guides 72 held in spaced relation and adjustably secured to the wall of the housing 27 through the agency of a pair of screw bolts 139

73 equipped with adjustable nuts 74 and rings 75 provided with lugs 76 adapted to enter recesses 77 on the outer periphery of the said housing 27. The bolts 73 are disposed in vertical slots 78 so that the cam may be adjusted vertically to three different positions in each of which the cam is held against displacement by the lugs 76 engaging in the corresponding recesses 77, it being understood that the nuts 74 are tightened when a cam has been adjusted to one of these positions to fixedly secure the cam thereat. The guides 72 are flared at one end, as shown in Fig. 10, to provide cam means for guiding the ball shaped end 79 of the clutch-shifting lever 67 into the cam way. From the foregoing, it will be apparent that a continuous driving connection is established between each work-carrying spindle and a continuously driven member, including a clutch whereby the driving connection to each spindle may be broken or maintained in a manner determined and controlled by suitable cam means, and that by adjusting these cam means the spindles may be driven at different speeds or maintained stationary according to the operations to be performed on the work. In connection with the control of the spindles it will be noted that upon a spindle being moved to each new station, its drive is determined by the position of the cam means at that station so that in a complete cycle of the work carrier one spindle may be driven at the same or different speeds at the successive stations or maintained idle, the latter being desired at the loading station at which the work is placed in and removed from the chuck.

The work-carrier indexing mechanism is designed to rotate the carrier in step by step movements from station to station and, considering the heavy weight of the carrier and the desirability of indexing the same in a comparatively short interval of time, it will be apparent that special provision must be made in the indexing mechanism to enable the carrier to be quickly indexed without causing excessive strain and jar to the mechanism when starting and stopping the same. To this end I have included in the indexing mechanism a pair of elliptical gears whereby the rotative movement of the carrier will first be gradually accelerated and then its momentum gradually checked so as to diminish the resistance in stopping the carrier. I also employ a friction clutch for operating the elliptical gears, thereby enabling the same to be put gradually into operation, and I connect this clutch with a stop device cooperating with the work carrier for stopping the same at each station, the arrangement being such that when the work carrier in its rotation reaches a station, said stop device simultaneously and automatically throws out the clutch and engages and locks the carrier against rotation. Referring to Figs. 2 and 20, a bevel pinion 81 meshing with the rack 46 on the work carrier and fixed to a shaft 82 journaled in the wall of the housing 27 is connected to a clutch shaft 83 through the intermediary of a pair of elliptical gears 84 arranged as shown. A spur gear 85 loosely mounted on the clutch shaft is in connection with the drive shaft 57 through the intermediary of gears 86 that are arranged to reverse the direction of drive of the shaft 57 to the shaft 82 so that the carrier will be rotated in the proper direction. Any suitable friction clutch may be employed to establish driving connection between the shaft 83 and the loose gear 85 thereon, that shown comprising a cone-faced member 87 splined to the shaft 83 and adapted to be moved axially of the shaft into engagement with a similar cone friction face (not shown) on the gear 85. The movable element 87 of this clutch is connected to the lower end of a lever 88 that is pivoted intermediate its ends at 89 to an extension bracket of the housing 54 and is pivotally connected at its upper end to a locking-pin 91 that is slidably mounted in said bracket and the housing 27 so as to move radially with respect to the work carrier into and out of engagement therewith. An expansion spring 92 constantly urges the locking-pin into engagement with the work carrier and the latter is provided with a plurality of circumferentially spaced sockets 90 so that the locking-pin will be forced into whatever socket is carried into its path. In Fig. 2, the work carrier is shown locked against rotation by the pin 91 and the friction clutch is thrown out. It will be apparent that upon withdrawing the locking-pin 91 from the work carrier the friction clutch will be thrown into engagement so as to establish a driving connection between the drive shaft 57 and the indexing mechanism. Because of the arrangement of the elliptical gears, the rotation of the carrier will be gradually accelerated during the first half cycle of the gears so as to index the carrier with expedition and its momentum will then be gradually checked during the second half cycle so that the carrier may be stopped with the least possible jar and strain on the mechanism. Means for withdrawing the stopping pin and consequently putting the indexing mechanism into operation will be described hereinafter.

In order that the work carrier may be held with accuracy and precision at the stopping station, I have provided a locating or centering pin 93 (Fig. 9) adapted to engage and accurately center the carrier and hold or lock it in a very substantial manner against rotation. This locating pin, cylindrical in form and slidably mounted in a longitudinal bearing 94 integral with the side column 29, is provided with a cone-shaped head 95 adapted to enter any of the corresponding cone-shaped sockets 96 formed in the periphery of the work carrier intermediate the spindles thereon. Means described hereinafter is provided for moving the locating-pin into operative engagement with the work carrier just after the same has been stopped by the stopping-pin and for withdrawing the locating pin just prior to the commencement of the indexing operation.

The main tool carrier 39 slidably mounted on the center column 32 and provided with lateral arms 97 is in dovetailed sliding engagement with ways on the side columns 28 and 29 parallel with the center column. The tool carrier may be suitably constructed to provide for carrying various forms of boring, reaming and shaping tools above the spindles so that the same may be moved into and out of operative position relatively to work carried by the chucks by backward and forward movement of the tool carrier on the guide columns. Since various forms of tool-holding means adapted to be mounted on the carrier 39 are well known in the art, I have not deemed it necessary to describe in detail these holders but have, for purpose of illustration, shown several such holders 98 somewhat diagrammatically.

The mechanism for moving the tool carrier on the guide columns includes a shaft 99 disposed within the center column coöperable with the tool carrier and movable to effect raising and lowering of the same. In the present instance, the upper end of the shaft 99 is fixedly secured by means of a pin 101 to a portion of the carrier that extends diametrically through the column, the shaft being screw threaded throughout its lower portion which passes through an internally threaded element adapted to be rotated to feed the screw shaft axially and thus effect the raising and lowering of the tool carrier. In order to facilitate this movement and largely relieve the screw shaft 99 from the load of raising the heavy tool carrier, I have provided means for partially counter-balancing the weight of the carrier, which means consist of weights 102 disposed in the side columns and connected by cables 103 run over sheaves 104 to the carrier. The nut element 105 engaging the screw shaft 99 is made integral with a worm gear 106 that is mounted between end thrust bearings in the housing 35 and is in mesh with a worm pinion (not shown) fixed to a feed shaft 107 journaled centrally in a bearing in the housing 27 and at its ends in bearings in the housings 35 and 54. It will be readily seen that by rotating the feed shaft 107 in opposite directions, the tool carrier 39 will be moved upwardly or downwardly through the agency of the worm gear and screw connection described.

It is desirable to automatically feed the tool carrier backwardly and forwardly at various speeds in timed relation with the indexing of the work carrier with the view to celerity in operation and accuracy of work. To this end, mechanism is provided for moving the tool carrier in a rapid traverse or approach movement into close proximity to the work carrier, then in a feed movement during the operation of the tools on the work, then holding the tool carrier stationary for a short interval at the termination of the cutting so as to smooth the surfaces, and finally retracting the tool carrier in a relatively rapid movement. This mechanism, driven from the same source of power that is employed to drive the indexing mechanism and spindle driving mechanism, is, when the machine is being operated, put into and out of operation by the action of the rotary work carrier and reciprocable tool carrier which actuate certain control mechanisms to effect the orderly operations of the said carriers.

Coming now to the work-carrier feed mechanism and referring particularly to Figs. 13 and 14, a plurality of independent friction clutches, designated in general by reference characters 108, 109 and 111 are mounted on the feed shaft 107 and connected with the drive shaft 57. These clutches are so designed and connected to the drive shaft 57 that any clutch may be thrown into engagement independently of the others to connect the shaft 107 to the said drive shaft. By providing different series of gearing between the shaft 57 and the said clutches, the feed shaft 107 may be driven at variable speeds in one direction and reversed to effect the various movements of the tool carrier described above. Thus the clutch 108 effects the rapid approach movement of the tool carrier, clutch 111 the feed movement, and clutch 109 the rapid reverse movement, the arresting of the tools at the end of cutting operation being effected by a mechanism described hereinafter which coöperates with the clutch mechanism. The gearing between the several clutches on the feed shaft 107 and the drive shaft 57 is as follows. Referring to Figs. 2 and 21, the gear 112 of the rapid approach clutch is in mesh with a gear 113 carried by a stub shaft 114 suitably mounted on the housing 54, which gear meshes with a gear 115 fixed to the drive shaft 57. In Fig. 22, the gear 116 of the rapid reverse clutch 109 is driven from a gear 117 fixed on the drive shaft 57 through the intermediary of gears 118 and 119 which reverse the drive of the gear 116 with respect to the drive of the gear 112. Figs. 19 and 24 are best illustrative of the feed clutch drive which is taken from the spindle drive shaft 53 that is constantly driven through the intermediary of the gears 55 and 56. A gear 121 fixed to the shaft 53 meshes with a gear 121 fixed to a counter shaft 123 that is journaled in suitable bearings and extends through the end wall of the housing 54. This counter shaft 123 has fixed to its outer end a change gear 124 meshing with a change gear 125 which in turn is fixed to a stub shaft 126 journaled in the said end wall of the housing and carries at the inner side of said wall a fixed gear 127 meshing with the gear 128 of the feed clutch 111. This latter arrangement of gearing gives a considerable reduction in speed so that the feed clutch gear will be rotated quite slowly.

By removing the change gears 124 and 125 and substituting therefor another pair of a different ratio, the speed of the feed clutch may be changed. In a similar manner by substituting for the gears 55 and 56 a pair of gears of a different ratio the drive of the work carrying spindles may be varied. By this provision of gearing, the driving element of each clutch, viz., the gear-carrying element, is constantly driven by the drive shaft at a speed and in a direction proper to drive the feed shaft 107 at a predetermined speed to effect the above-mentioned movements of the tool carrier. In the clutches 108 and 109 the constantly driven elements in the form of spur gears 112 and 116 are provided with hubs 129 (Fig. 14) loosely journaled on the shaft 107 and in a bearing 131 integral with the housing 54, and the gear 128 of the clutch 111 is provided with a hub or sleeve bearing 132 loosely journaled in a bearing in the end wall of said housing. Within each of these gears is an expansible split band 133, best shown in Fig. 17, that is fixedly secured at 134 to a collar 135 in turn fixedly secured to the shaft 107. By expanding these bands, the several gears may be frictionally engaged with the shaft 107 so as to thereby connect the same with the drive shaft. Rocker arms 136 are employed to expand the bands, being each equipped with a lug 137 disposed intermediate the ends of a band and so arranged that when the arm 136 is swung outwardly from the position shown in Fig. 17, the lug 137 will expand the free ends of the band and thus connect the gear to the shaft 107. A double cone-faced clutch-follower 138 slidably mounted on the shaft 107 intermediate the clutches 109 and 111 may be shifted lengthwise of the said shaft by a lever 139 to engage either of said clutches, this effect being obvious as the cone faces engage the screw-equipped ends 141 of the arms 136 and shift the latter to expand the bands 133. In the case, however, of the clutch 108, a different form of follower is employed and the outer end of the arm 136 of this clutch is extended away from the clutch proper for a purpose presently apparent. A collar 142 slidably mounted on the shaft 107 carries a trip-block 143 that is pivotally secured at 144 to the collar 142 and arranged so that it may swing on its pivot in a clockwise direction, viewing Fig. 14, but is held in upright position in abutting relation to the said collar 142 by a spring 145. The collar 142 is connected to the clutch-shifting lever 139 by means of rods 146 so that when the said lever 139 is shifted the collar and its follower will be likewise shifted. By reason of this construction and relative arrangement of the several clutch followers, the follower 143 may maintain its clutch 108 engaged while the follower 138 is in a neutral position, and said follower 143 will function as such only upon movement of the clutch-shifting means in one direction. Thus, I am enabled to operate the three clutches (and an auxiliary retarding mechanism hereinafter described) through the intermediary of a single lever such as the shifting lever 139. It will be obvious that upon shifting the follower 138 to the right, viewing Fig. 14, the clutch 108 will be disengaged and the clutch 111 engaged, and upon shifting said follower in the opposite direction the clutch 111 will be disengaged and the clutch 109 engaged, the trip-follower 143 having then no effect, since as it passes the adjacent arm 136 it will swing on its pivot beneath the same against the tension of the spring 145. Regarding the means for shifting the clutches attention is directed to the yoke connection between the lower end of the lever 139 and the follower 138 in which blocks 147 swivelingly connected to pins 148 are of less width than the space between the flanges 149 of the follower 138 between which flanges the said blocks operate. The purpose of this construction will appear hereinafter.

Means are provided for automatically retarding the movement of the clutch shifting lever 139 as-it is shifted to disengage the feed clutch and throw in the rapid reverse clutch so that for a predetermined short period intermediate the throwing out of the former and the throwing in of the latter the feed shaft will remain stationary, and consequently hold the tools at the termination of their feed movement so as to remove the tool marks and smooth the cutting. This means or mechanism, best shown in Figs. 14, 15 and 16, comprises a collar 151 slidably mounted on the outer end of the shaft 107 and connected by means of an elongated key 152 to the follower 138 so that upon shifting said follower lengthwise of the shaft, the collar 151 will be likewise shifted. This collar carries a pivoted radially extending finger 153 constantly urged outwardly to the position shown in Fig. 14 by a suitable spring, such as 154. The finger 153 coöperates with a pair of rings 155 and 156 secured in spaced relation in a cylindrical casing 157 which in turn is fixedly secured to the hub 132 of the gear 128 so as to be constantly driven. As shown clearly in Fig. 16, the rings 155 and 156 are provided at their internal edges with a plurality of notches 158 and 159, respectively, forming openings through which the finger 153 is adapted to pass when the lower end of the clutch shifter is moved as described above, that is, to the left from its position in Fig. 15. This movement of the clutch shifter will, of course, be arrested, since the finger 153 will first engage the outer face of the ring 156, thereby stopping movement of the shifter until the casing 157 in its rotation has brought one of the openings 158 into registration with the finger 153, allowing said finger to pass through the opening and into engagement with the second ring 155 which likewise will arrest movement of the shifter as determined by the rotation of the said casing and the spacing of the openings 159 in said ring. The ring 156 is rotatably adjustable with respect to the ring 155 so that the openings 158 and 159 may be relatively adjusted. An end casing section 160 may be suitably detachably secured to the casing 157 so as to completely house the retarding mechanism and allow access to the same for adjustment. From the foregoing it will be evident that in the operation of throwing in the feed clutch 111 by shifting the follower 138 to the right, the finger 153 will be simply depressed when passing the rings 155 and 156 and upon moving the expander in the opposite direction the mechanism just described will arrest its movement in a predetermined manner as determined by the rotation of the feed clutch gear and the spacing of the openings. Since, as will be described more fully hereinafter, a spring force is employed to throw out the feed clutch, the same is not thrown out by the first impulse of the spring pressure, due to the lengthwise play between the blocks 147 and the flanges 149, but by a striking impact of the blocks 147, thus effecting instantaneous release of the clutch so that the feed of the tools may be stopped with a very fine degree of accuracy. The action of throwing out this clutch brings the retarding mechanism into operation and, as already explained, the movement of the follower 138 to throw in the rapid reverse clutch is arrested by this retarding mechanism for a predetermined interval of time.

The automatic control mechanism, whereby the tool carrier feed mechanism and the carrier indexing mechanism are controlled, will now be described. The clutch-shifting lever 139, as shown in Fig. 23, is secured to a rock shaft 162 extending crosswise of the housing 54 and journaled in the side walls thereof and equipped with a fixed rocker arm 163 that extends above the top wall of the said housing. The upper end of this arm 163 is pivotally connected to and intermediate the ends of a control rod 164 slidably mounted in bearing brackets 165 and 166 and urged constantly in one direction, that is, to the right viewing Fig. 13 by an expansion spring 167. A spring-pressed detent 168 slidably mounted in the bracket 166 is adapted to engage in any of a plurality of notches 169, 171 and 172 formed in the upper face of the rod 164 and hold said rod in a set position against the influence of the spring 167. A lever 173 pivotally mounted intermediate its ends on the bracket 165 is pivotally connected at one end to the detent 168 and adapted to be actuated at its end 174 to withdraw the detent from operative position. The slide rod 164 may be moved inwardly against the influence of the spring 167, by means of a lever 175 pivoted intermediate its ends at 176 to an extension of the housing 27 and pivotally connected at its lower end 177 to the rod 164. The upper end of the lever 175 is pivotally connected at 178 to the rod 179 slidably mounted in a bearing 181 integral with the housing 27 and equipped within said housing with a roller 182 adapted to be actuated by cams 183 and 184 secured to the periphery of the work carrier wall 44 in the manner shown in Fig. 7. These cams it will be noted are grouped in pairs equally spaced about the carrier corresponding in number to the number of spindles, the cams 183 being of less height, that is radial dimension, than the cams 184. It will also be noted that in the position of the parts shown in Fig. 13, the roller 182 is held just out of the path of the highest cam so as not to be actuated thereby. The upper end of said lever 175 is also equipped with a laterally projecting spring-pressed finger 185 (Figs. 5 and 18) adapted to be actuated by a cam 186 secured to a vertical slide rod 187. This slide rod or cam-carrying means 187 and a sliding cam 188 are adjustably connected at their upper ends to one of the lateral arms 97 of the tool carrier through the agency of a screw-threaded rod 189 passing through and secured to an extension 191 of the said arm 97 by adjusting nuts 192, thus enabling the cam means to be adjusted vertically with respect to the tool carrier. The sliding cam 188, as shown best in Figs. 11 and 12, passes through an aperture 193 in the locating pin 93 and is shaped so that its lower portion 194 is offset with respect to its upper portion in a manner to shift the locating pin lengthwise upon sliding the cam 188 through the locating pin from its lower to upper portion, and vice versa. Referring again to the cam 186, it will be observed, viewing Figs. 5 and 13, that the lower edge of the cam is beveled at 195 so that when moved downwardly past the finger 185, the latter will be engaged and moved outwardly by said face 195 so as to swing the lever 175 to the position shown in Fig. 15, and consequently throw in the feed clutch. By this movement the rod 164 is slid inwardly until its notch 172 is engaged by the detent 168, thus holding the clutch mechanism locked in this position and compressing the spring 167. The parts may obviously be released from this position by depressing the end 174 of the lever 173 to withdraw the detent 168, whereupon the pressure of the spring 167 will be exerted to slide the rod 164 outwardly and shift the clutch-operating lever to throw out the feed clutch and throw in the rapid reverse clutch in the manner described above. The lever 173 is actuated to release said parts by means of a trip rod 196 in vertical alinement with the end 174 of said lever and adjustably secured to the extension 191 of the lateral arm 97 of the tool carrier so as to be adjustable vertically with respect thereto. The operating end of the trip rod 196 may be equipped with a micrometer adjustment 197 to enable very accurate control. The cam 186 in its downward movement will be carried past the finger 185 before the lever 173 is tripped and will actuate the clutch mechanism as will be presently described. To prevent said cam 186 in its upward movement (effected by tripping of the lever 173) from actuating the finger 185, I have rounded the outer upper edge of the cam at 198, Fig. 5, so that the curved surface of the cam will simply press the finger into its housing, without actuating the finger-carrying means. The slide rod 187 also carries a cam 199 similar in construction to the cam 186 and disposed on the side of the rod opposite to that carrying the cam 186, as shown in Figs. 3, 4 and 5. The cam 199 also spaced beneath the cam 186 and arranged with its inclined face uppermost, is adapted to withdraw the stop pin 91 and put the indexing mechanism into operation. Referring especially to Figs. 3, 4 and 11, the said cam 199 in its upward movement engages and actuates a spring-pressed finger 201 similar in construction to the finger 185, carried by a horizontal rod 202 slidably mounted in a suitable bearing and pivotally connected at its outer end to the pivot bolt 203 which connects the locking pin 91 to the clutch-shifting lever 88. It will be obvious that the cam 199 will in its upward movement engage and pass the finger 201, slide the rod 202 outwardly, and consequently withdraw the stopping pin 91 and simultaneously throw into engagement the friction clutch 87, the said cam having a rounded lower edge which merely presses the finger 201 inwardly as the cam passes the latter on its downward movement. Suitable means may be provided for adjusting the cams 186 and 199 vertically on the rod 187.

In addition to the vertically movable tool carrier 39, there is also a horizontal cross-feed tool carrier mounted on each of the side columns 28 and 29 that is operated by the main tool carrier so that all of the tools will be simultaneously carried into and put out of operation. Since these horizontal feed tool carriers on each column are similar, I will describe in detail the construction and operation of but the one mounted on the column 29. Referring particularly to Figs. 1 and 2, a carriage designated in general by reference character 204 slidably mounted on vertical dove-tail ways 205 integral with the column and may be fixedly secured to said ways by any suitable means such as by tightening the gibs 206 (Fig. 6) by means of adjusting screws 207. A tool carrier 208 mounted to slide in a horizontal plane on the carriage 204 for actuation by a screw shaft 209 that is rotatably mounted on the carriage, is held against axial movement by and passes through a nut 211 fixed to the tool carrier. This screw rod is connected by means of a pair of intermeshing gears 212 to a shaft 213 mounted on the carriage and equipped with a spur pinion 214 that meshes with a rack 215 in turn adjustably connected to an extension 216 of the arm 97 of the main tool carrier. It will be apparent, as the tool carrier 39 is moved backwardly and forwardly to bring its tools into and out of operation, that the tools on the carrier 211 will likewise be moved into and out of operation but will operate only on the work carried by the two chucks disposed directly opposite the inner ends of the horizontal feed tool carriers. By removing the spur gears 212 and substituting another pair of different ratio the advance of the laterally operating feed tool carriers may be varied.

The operation of my improved automatic multiple spindle turret lathe is as follows: One of the stations, for instance, that at which the chuck 43ª (Fig. 1) is located, may serve as a loading and unloading station, and for this purpose the carrier 39 is not equipped with a tool carriage 98 so that the operator may have entire freedom of action above the chuck to mount and remove the work. At this station the spindle clutch cam 72 will be adjusted to neutral position so that as each spindle is moved to this station, its clutch will be automatically thrown out of engagement. While the operator is loading the stationary chuck, the work carrier is at rest, the remaining chucks revolving and both the vertical and lateral feed tool carriers being moved into and out of operation. At a predetermined point in the retracting movement of the tool carrier, the work carrier will be indexed to advance the chucks to a new station and just prior to the completion of this indexing movement the tool carriers will commence approach to the work, being put into operation by the indexing movement of the work carrier. These movements are carried on automatically while the machine is in operation and at no one time except during the operation of the retarding mechanism are both the tool and work carriers stopped. It is understood, of course, that before the machine is started the tools of both the vertical and lateral feed carriers are properly adjusted and set, the spindle clutch control cams adjusted to determine the driving speed of the spindles at the different stations and the cams 186 and 189 and the trip rod 196 are also properly adjusted in accordance with the work that is to be accomplished. It will also be understood that each of the tool carriers carries a tool or tools for performing an operation different from that of the others, so that, as the work is moved from station to station, the tools will operate successively on each piece of work until, when the final station is reached, there has been a plurality of different cutting operations performed on each piece of work. The several operative parts of the lathe are shown throughout the drawings, with the exception of Fig. 15, to be in position with the tool carriers just commencing approach to the work. During this operation the chucks, excepting chuck 43ª, are being constantly rotated in the manner described above, the locking pin 91 has engaged and is holding the work carrier stationary and the rapid approach clutch 108 is engaged, as shown on Fig. 13, to effect the rapid approach movement of the tools in the manner described above. As the tools approach the work the traveling cams and trip carried by the main tool carrier will actuate at different intervals the mechanisms which they respectively control. The first to function is the sliding cam 188 which moves the locating pin 93 into engagement with the work carrier prior to engagement of the tools with the work so as to center and hold the spindles in perfect alinement with the tools. Shortly after the locating pin has been thrown in, the cam 186 will function to throw out the rapid approach clutch and engage the feed clutch through the intermediary of the control and clutch shifting mechanisms already described. The feed clutch locked in engagement by means of the spring-pressed detent 168 merely reduces the advance motion of the tools to a speed appropriate for the cutting operation of the tools. When the cutting operation has been completed, the trip rod 196 will trip the lever 173 allowing the spring 167 to throw out the feed clutch in a quick movement so as to instantly stop the feed of the tools at the desired depth of cutting. The clutch-shifting lever 139 being moved under the influence of the spring 167 is now arrested or retarded in its movement by the retarding mechanism in the manner described above so that the tools will remain stationary for a predetermined interval determined by said retarding mechanism to smooth the work and give it a finely finished appearance. It will be obvious that since the downward movement of the principal tool carrier is stopped almost instantly upon tripping the lever 173, the cam and actuating devices connected to said carrier will be likewise stopped, and the detent 166 held in raised position. After the retarding mechanism has completed its function the rapid reverse clutch is thrown in by the action of the spring 167, it being noted that during this movement of the clutch-shifting device, the pivoted follower 143 is carried past the adjacent clutch expanding arm 136 in such a manner as not to operate the same. Also by reason of the rapid reverse clutch being thrown into engagement, the control rod 164 will be moved to its outermost position and the detent 168 will rest on the top surface of said rod approximately at the point A (Fig. 13). At a predetermined point in the reverse movement of the tool carrier the sliding cam 188 will withdraw the locking pin 91 and simultaneously engage the friction clutch 87. This causes the work carrier to be indexed in the manner described above. Referring to Figs. 7 and 13, it will be evident that since the rapid reverse clutch is engaged at the time the work carrier commences to index, the roller 182 on the slide rod 179 will be positioned in close proximity to the periphery of the work carrier intermediate the cams 183 and 184, as shown in dotted lines in Fig. 7. Hence, when the work carrier commences to index, the cam 188 will engage the roller 182 and will move the rod 179 outwardly, which will move the control rod 164 inwardly, throwing the reverse clutch out of engagement, the said control rod being moved inwardly just sufficiently to allow the detent 168 to engage in the notch 169 and hold the clutch-operating parts locked in position with the rapid reverse clutch thrown out so that the tool carrier is stationary. After the cam 199 has put the indexing mechanism into operation, and consequently stopped the reverse movement of the tool carrier, the latter, due to its being moved at a faster rate of speed than the initial rotative movement of the work carrier and due also to the slight interval required to fully engage the clutch 87, will be carried sufficiently in its reverse movement to withdraw the cam 199 from engagement with the finger 201 so that the stop pin 91 will be free to be moved under the influence of spring 92. While the clutch 87 is engaged and the carrier is being indexed the locking pin 91 will be yieldingly urged against the periphery of the work carrier so that when the next succeeding socket 90 in the work carrier reaches said locking pin the same will be forced into the socket, thereby releasing the clutch 87 and stopping the rotation of the carrier. But just prior to stopping the carrier, the next succeeding cam 184 on the work carrier will engage the roller 182 and actuate the clutch-control mechanism to throw in the rapid approach clutch. In doing this the control rod 164 is moved inwardly until the detent 168 engages in the notch 171, as shown in Fig. 13, it being evident that while the clutch-shifting mechanism is in neutral position the follower 143 is positioned a short distance to the left of and out of engagement with the adjacent arm 136, so that movement of said follower to the right engages the rapid approach clutch. Thus with the work carrier locked at a new station and the tool carriers in rapid approach movement (the positions assumed when commencing the description of the operation), the automatic operation of the tool carrier will be repeated and likewise the work carrier will be automatically indexed in proper sequence. This operation will continue automatically while the motor is running and may be discontinued by stopping the motor or drive of the shaft 57. Suitable means may be provided for commencing and stopping the operation, and it will be obvious that the slide rod 164 constitutes a control member adapted to be manually or otherwise actuated to put the lathe into or out of operation.

It is believed that the foregoing conveys a clear understanding of the principles and operation of my improvements and the manner in which the several objects of the invention prefaced above are accomplished. It should be understood that my improvements are adaptable in a horizontal spindle as well as a vertical spindle turret lathe and various alterations and arrangement of parts and changes in details of construction may be resorted to without departing from the spirit and scope of the invention as expressed in the appended claims.

I claim:

1. In a multiple spindle lathe, the combination with a work carrier and a tool carrier one of which is rotatable with respect to the other, of mechanism for indexing the rotatable carrier including a pair of elliptical gears.

2. The combination of a rotatable carrier adapted to be rotated in step by step movements to different stations, and means for so rotating the carrier including a pair of elliptical gears for gradually accelerating the rotative movement and gradually checking its momentum.

3. In a multiple spindle lathe, the combination of a rotatable work carrier equipped with a circumferential rack, a pinion meshing with said rack, a pair of elliptical gears in driving relation to said pinion, and means for rotating said elliptical gears intermittently to index the work table at predetermined intervals.

4. The combination of a rotatable carrier, mechanism for rotating the same in step by step movements to different stations, a stop pin and a centering pin movable into engagement with the carrier for arresting and centering the carrier at each station, a carrier movable toward and away from the rotary carrier, and mechanism actuated in part by movement of the reciprocable carrier to first move the stop pin and then the centering pin into operative position.

5. In a multiple spindle lathe, the combination with a frame having a central column, of a work carrier and a tool carrier so mounted that one of said carriers is rotatable about and the other is reciprocable upon the central column, and a member within the central column coöperable with the reciprocable carrier and operable to effect sliding movement thereof on the central column toward and away from the rotatable carrier.

6. In a multiple spindle lathe, the combination with a frame having a central column, of a work carrier and a tool carrier so mounted that one of said carriers is rotatable about and the other is reciprocable upon the central column, a screw threaded shaft within the central column coöperable with the reciprocable carrier for effecting movement thereof on the central column, and a rotatable nut engaged with said shaft for moving the same axially to move the reciprocable carrier toward and away from the rotatable carrier.

7. In a multiple spindle lathe, the combination with a work carrier and a tool carrier, of a central column about which a work carrier is rotatable and upon which the tool carrier is slidable toward and away from the work carrier, a screw shaft within the column coöperable with the tool carrier and movable axially of the column to move the tool carrier thereon, and a rotatable nut engaged with the screw portion of said shaft for moving the same axially.

8. In a multiple spindle lathe, the combination with a rotatable work carrier and a tool carrier movable relatively thereto, of mechanism for moving the tool carrier actuated by the work carrier at predetermined points in its rotation to effect starting and stopping of the tool carrier.

9. In a multiple spindle lathe, the combination of a rotatable work carrier and a tool carrier movable relatively thereto, of mechanism put into and out of operation by rotation of the work carrier to move the tool carrier relatively to the work carrier, and mechanism put into operation through movement of the tool carrier for rotating the work carrier.

10. In a multiple spindle lathe, the combination of a rotatable work carrier and a tool carrier movable relatively thereto, of mechanism operable between the tool carrier and work carrier to control movement of the tool carrier relatively to the work carrier through relative movement of the latter and to control rotative movement of the work carrier through movement of the tool carrier.

11. In a multiple spindle lathe, the combination of a rotatable work carrier, a tool carrier movable toward and from the work carrier, mechanism for indexing the work carrier, means actuated by the tool carrier at a predetermined point in its movement to put the said indexing mechanism into operation, and means actuated by the work carrier at a predetermined point in its rotation to stop the operation of the indexing mechanism.

12. In a multiple spindle lathe, the combination of a rotatable work carrier having thereon a plurality of circumferentially spaced cams, a tool carrier movable toward and away from the work carrier, mechanism for moving the tool carrier, and means actuated by said cams on the work carrier for putting said mechanism into and out of operation.

13. In a multiple spindle lathe, the combination with a work carrier and a tool carrier, one of which is rotatable and one reciprocable, of a plurality of circumferentially spaced cams on the rotatable carrier, continuously driven mechanism connected with said reciprocable carrier for moving the same relatively to the rotatable carrier including a clutch device for throwing the mechanism into and out of operation, and means actuated by said cams on the rotary carrier for throwing said clutch device into and out of operation.

14. In a multiple spindle lathe, the combination with a rotatable work carrier and a tool carrier movable toward and away therefrom, of mechanism for indexing the work carrier, mechanism for moving the tool carrier relatively to the work carrier, and means actuated by the work carrier during its indexing movement for throwing said tool carrier mechanism into and out of operation at predetermined intervals of each indexing of the work carrier.

15. In a multiple spindle lathe, the combination with a rotatable work carrier and a tool carrier movable toward and away therefrom, of mechanism for indexing the work carrier, mechanism for moving the tool carrier relatively to the work carrier, and means actuated by the work carrier in its indexing movement to first put said tool carrier moving mechanism out of operation and then to put said mechanism into operation prior to the completion of the said indexing movement.

16. In a multiple spindle lathe, the combination with a tool carrier and a work carrier one of which is rotatable to different stations and one of which is reciprocable to bring the tools into and out of operation, of mechanism for moving the rotary carrier from station to station at predetermined intervals, and mechanism for actuating the reciprocable carrier put into and out of operation by the rotary carrier during its movement.

17. In a multiple spindle lathe, the combination with a rotatable work carrier and a reciprocable tool carrier, of mechanism for indexing the work carrier to various stations, and mechanism for reciprocating the tool carrier comprising a shaft adapted when driven in opposite directions to likewise move the tool carrier, a pair of clutch devices mounted on the shaft constantly driven in opposite directions and adapted to be independently connected to the shaft, and means actuated by rotary movement of the work carrier and reciprocable movement of the tool carrier for throwing said clutches into and out of operation at predetermined intervals.

18. In a multiple spindle lathe, the combination with a tool carrier and a work carrier one of which is rotatable to different stations and one of which is reciprocable to bring the tools into and out of operation, of mechanism for moving the rotary carrier from station to station at predetermined intervals, mechanism for moving the reciprocable carrier into and out of operation put into action by the rotary carrier, and means actuated by the rotary carrier for causing said rotary carrier to be stopped at each station.

19. In a multiple spindle lathe, the combination with a tool carrier and a work carrier one of which is rotatable to different stations and one of which is reciprocable to bring the tools into and out of operation, of a continuously rotating driving member, a driven member and connections therefrom to the reciprocable carrier for moving the same in opposite directions upon being likewise driven, connections between the driving and driven members including clutches adapted to rotate the driven member in opposite directions, and mechanism for operating said clutches actuated by movement of the rotary carrier and movement of the reciprocable carrier.

20. In a multiple spindle lathe, the combination with a tool carrier and a work carrier one of which is rotatable to different stations and one of which is reciprocable to bring the tools into and out of operation, of a continuously rotating driving member, a driven member and connections therefrom to the reciprocable carrier for moving the same in opposite directions upon being likewise driven, connections between the driving and driven members including clutches adapted to rotate the driven member in opposite directions, means operated by said driving member for moving the rotary carrier from station to station, mechanism put into operation by rotation of said rotary carrier for throwing in one of said clutches to effect approach of the tools and work and put into operation by movement of the reciprocable carrier to throw this clutch out and the other clutch in at a predetermined point in the movement of said reciprocable carrier, said mechanism being actuated by rotation of the rotary carrier to throw out the last named clutch whereby to stop said reciprocable carrier.

21. In a multiple spindle lathe, the combination with a relatively movable work carrier and a tool carrier, of means for effecting such relative movement comprising a shaft rotatable in opposite directions, a single control lever, and mechanism operable through the intermediary of said lever to effect successively rapid approach of the tool carrier toward the work carrier, feed movement of the tool carrier during cutting operation, retarding of the tool carrier, and rapid reverse or retracting of the tool carrier.

22. The combination with a work carrier and a tool carrier one of which is reciprocable to bring the tools into and out of operation, of clutch controlled mechanism for operating the reciprocable carrier including a clutch engageable to move the tools and work relatively into operation and a second clutch engageable to move the same out of operation, and means for operating the clutches comprising a clutch-shifting device under the influence of a spring tension for urging the said shifting device to disengage the first named clutch and to engage the second named clutch, the clutch-shifting device having a lost motion during the initial operation under the influence of the spring pressure to effect a quick disengagement of the first named clutch.

23. The combination with a work carrier and a tool carrier, one of which is reciprocable to bring the tools into and out of operation, of mechanism for moving the reciprocable carrier including independent clutches for moving the tools into and out of operation, a device shiftable to engage and disengage the clutches, means for holding said device in a set position with the first mentioned clutch engaged, means actuated by the reciprocable carrier for releasing said shifting device from said set position, means constantly urging the shifting device to engage the second named clutch, and means for delaying the shifting device in its movement to engage the second named clutch for a predetermined period.

24. In a multiple spindle lathe, the combination with a work carrier and a tool carrier one of which is reciprocable to bring the tools into and out of operation, of mechanism including a plurality of clutches for reciprocating said reciprocable carrier, one of said clutches being adapted to effect approach of the tools and the other retracting of the same, a clutch shifting member, control means connected thereto and constantly urged to effect engagement of the second named clutch, means for holding said clutch control means in set position wherein the first named clutch is engaged, means for releasing the control means from said set position at a predetermined point in the approach movement of the reciprocable carrier, and means preventing for a predetermined period engagement of the second named clutch after disengagement of said first named clutch.

25. The combination with a work carrier and a tool carrier one of which is reciprocable to bring the tools into and out of operation, of automatic control mechanism for so moving the reciprocable carrier including independent clutches for effecting movement of the tools into and out of operation, a clutch shifter, control means for holding the clutch shifter set in any of a plurality of positions in which the said clutches are held engaged, and traveling cam means connected to and movable by the reciprocable carrier for actuating said control means.

26. In a multiple spindle lathe, the combination of a shaft, three clutches mounted thereon each having a continuously driven member adapted to be connected to the shaft for driving the same, one of said members being driven oppositely to the other two which are driven at different speeds, a lever, means operated thereby for throwing two of said clutches into and out of operation upon movement of the lever in opposite directions, and means operable between the lever and the third clutch for throwing the same into and out of operation at a point intermediate the throwing in and out of said two clutches.

27. The combination with a work carrier and a tool carrier, one of which is reciprocable to bring the tools into and out of operation, of mechanism for reciprocating the reciprocable carrier including a plurality of clutches adapted to effect feed and retracting movements of the reciprocable carrier, clutch operating means including means for holding the same in set position with the feed clutch engaged, spring actuated means constantly exerting pressure to move the clutch-operating means to engage the retracting clutch, means actuated at a predetermined point in the feed movement of the reciprocable carrier to release the clutch-operating means from said set position whereupon the said operating means will be moved by the spring-actuated means to engage the retracting clutch, and means for delaying the movement of said clutch-operating means when the latter has been thrown out to prevent engaging of the retracting clutch for a predetermined period.

28. The combination of a work carrier and a tool carrier one of which is reciprocable to bring the tools into and out of operation, of mechanism for moving the reciprocable carrier comprising a plurality of clutches, one for effecting rapid approach of the tools relatively to the work, one to effect feed movement and one to effect retracting or moving of the tools out of operation, a clutch shifting lever and connections therefrom to the clutches adapted for engaging and disengaging the same, a control member connected to the said shifting lever, means for holding the control member in any of a plurality of positions wherein to hold said clutches separately engaged, and cam means connected to and movable by the reciprocable carrier for moving said control member from rapid approach to feed position and to subsequently release the same from said feed position.

29. In a multiple spindle lathe, the combination with a work carrier and a tool carrier one of which is rotatable in step by step movements to different stations and one of which is reciprocable to bring the tools into and out of operation, of mechanism for indexing the rotating carrier to the various stations, mechanism for reciprocating the reciprocable carrier including a plurality of clutches, one for effecting rapid approach of the tools, one for effecting feed movement thereof and one for effecting reverse of the tools, means for shifting the clutches, means actuated by the reciprocable carrier at a predetermined point in its approach movement to throw the approach clutch out of engagement and the feed clutch into engagement and to subsequently throw the latter clutch out of engagement, means for engaging the reverse clutch at a predetermined point after the disengagement of said feed clutch, means actuated by the reciprocable carrier to put said rotary carrier operating mechanism into operation at a predetermined point in the reverse movement of the said reciprocable carrier, and means actuated by the rotary carrier to throw said reverse clutch out of engagement and to subsequently throw the approach clutch into engagement.

30. In a multiple spindle lathe, the combination with a tool carrier and a work carrier one of which may be indexed to different stations and one of which is reciprocable to bring the tools into and out of operation, of mechanism for indexing the rotary carrier, mechanism for reciprocating the reciprocable carrier comprising a shaft adapted to be driven in opposite directions to likewise move this carrier, a plurality of clutches mounted on said shaft each having a continuously driven member normally out of engagement with the shaft, one of said clutches serving to effect rapid approach of the tools with respect to the work, another to effect feed of the tools, and another to effect retracting of the tools; and automatic control mechanism for operating said clutches comprising a single lever coöperable with the clutches to throw in one of the clutches upon movement in one direction and to throw in the other two clutches at different points in its movement in the opposite direction.

31. In a multiple spindle lathe, the combination with a tool carrier and a work carrier one of which may be indexed to different stations and one of which is reciprocable to bring the tools into and out of operation, of mechanism for moving the reciprocable carrier comprising a shaft adapted to be driven in opposite directions to likewise move this carrier, a plurality of clutches mounted on said shaft each having a continuously driven member normally out of engagement with the shaft, one of said clutches serving to effect rapid approach of the tools with respect to the work, another to effect feed of the tools, and another to effect retracting of the tools; automatic control mechanism for operating said clutches comprising a clutch shifting device coöperable with the clutches to throw in one of the clutches upon movement in one direction and to throw in the other two clutches at different points in its movement in the opposite direction, and means actuated by rotary movement of the rotary carrier and reciprocable movement of the reciprocable carrier for putting the said control mechanism into operation.

32. In a multiple spindle lathe, the combination with a tool carrier and a work carrier one of which may be indexed to different stations and one of which is reciprocable to bring the tools into and out of operation, of mechanism for indexing the rotary carrier, mechanism for reciprocating the reciprocable carrier comprising a shaft adapted to be driven in opposite directions to likewise move this carrier, a plurality of clutches mounted on said shaft each having a continuously driven member normally out of engagement with the shaft, one of said clutches serving to effect rapid approach of the tools with respect to the work, another to effect feed of the tools, and another to effect retracting of the tools; automatic control mechanism for operating said clutches comprising a single lever coöperable with the clutches to throw in one of the clutches upon movement in one direction and to throw in the other two clutches at different points in its movement in the opposite direction, means for shifting said lever, means for holding said lever-shifting means in a plurality of set positions wherein to maintain any one of said clutches engaged, and means for operating the last mentioned means to effect successive operation of the clutches.

33. The combination of a work carrier and a tool carrier, one of which is reciprocable to bring the tools into and out of operation, mechanism for controlling the movement of the reciprocable carrier including a pair of relatively movable elements one of which is connected to and movable by the carrier and coöperable with the other element to effect operation of the control mechanism, said elements consisting of an inclined cam and a spring-pressed-finger adapted to be actuated by the incline of said cam upon movement of the carrier in one direction to effect said operation and to be depressed by the cam upon movement of the carrier in the opposite direction so as to have no effect on said mechanism.

34. The combination with a work carrier and a tool carrier one of which is reciprocable to bring the tools into and out of operation, of clutch controlled mechanism for operating the reciprocable carrier including a clutch engageable to move the tools and work relatively into operation and a clutch engageable to move the same out of operation, means for operating the clutches comprising a clutch-shifting device under the influence of a spring tension for urging the said shifting device out of engagement with the first named clutch and into engagement with the second named clutch, and means for delaying the movement of said clutch shifting means intermediate the throwing out of the first and engaging of the second named clutch.

35. In a multiple spindle lathe, the combination of a frame having a central column, a work carrier and a tool carrier mounted so that one of the carriers is rotatable about and the other reciprocable upon the central column, and a screw shaft within the central column and coöperable with the reciprocable carrier for moving the same longitudinally of and upon said column.

36. In a multiple spindle lathe, the combination of a revoluble work carrier and a tool carrier movable toward and away therefrom, mechanism for indexing the work carrier, and mechanism for moving the tool carrier toward and from the work carrier and being actuated by the work carrier at a predetermined point in its indexing movement to stop the movement of the tool carrier with respect to the work carrier.

37. In a multiple spindle lathe, the combination of a work carrier and a tool carrier, one of which is revoluble and the other reciprocable with respect to the revoluble carrier, mechanism put into operation by rotation of the revoluble carrier to move the reciprocable carrier, and mechanism put into operation through movement of the reciprocable carrier for revolving the revoluble carrier.

38. A multiple spindle lathe, the combination of a work carrier and a tool carrier, one of which is revoluble and the other reciprocable with respect to the revoluble carrier, mechanism for indexing the revoluble carrier, mechanism for reciprocating the other carrier, means actuated by the reciprocable carrier at a predetermined point in its movement to put said indexing mechanism into operation, and means actuated by the revoluble carrier at a predetermined point in its rotation to put the carrier-reciprocating mechanism into operation.

39. In a multiple spindle lathe, the combination of a work carrier and a tool carrier, one of which is revoluble and the other reciprocable with respect to the revoluble carrier, mechanism for indexing the revoluble carrier, a continuously driven mechanism for moving said reciprocable carrier toward and from the revoluble carrier including a clutch device for throwing the mechanism into and out of operation, and means actuated by and at a predetermined point in the indexing movement of the revoluble carrier for engaging said clutch device.

40. In a multiple spindle lathe, the combination of a work carrier and a tool carrier one of which is revoluble and the other reciprocable with respect to the revoluble carrier, a plurality of circumferential cams on the revoluble carrier, mechanism for indexing said revoluble carrier, mechanism for reciprocating the other carrier, and mechanism actuated by the cams on the revoluble carrier for putting said carrier-reciprocating mechanism into operation.

41. In a multiple spindle lathe, the combination of a work carrier and a tool carrier, one of which is revoluble and the other reciprocable with respect to the revoluble carrier, mechanism for indexing the revoluble carrier, mechanism for moving the reciprocable carrier relatively to the revoluble carrier, and means actuated by the revoluble carrier at a predetermined point in its indexing movement for putting said reciprocable-carrier mechanism into operation and for causing the indexing mechanism to be stopped.

42. In a multiple spindle lathe, the combination of a work carrier and a tool carrier, one of which is revoluble and one reciprocable with respect to the revoluble carrier, mechanism for indexing the revoluble carrier to various stations, mechanism for reciprocating the other carrier comprising a shaft and connections therefrom to the reciprocable carrier for moving the same in opposite directions upon similarly driving the shaft, gear driven devices constantly driven in opposite directions and adapted to be independently connected with the shaft, and means actuated by indexing movement of the revoluble carrier and reciprocable movement of said other carrier for causing said gear driven devices to drive said shaft in opposite directions at predetermined intervals.

43. In a multiple spindle lathe, the combination of a work carrier and a tool carrier, mechanism for controlling relative movement between said carriers comprising a series of individual devices adapted to be intermittently rendered operative to separately cause predetermined relative movements between said carriers, and an automatic control mechanism actuated by and at predetermined points in the relative movement of said carriers to cause said devices to be rendered operative and inoperative.

44. In a multiple spindle lathe, the combination with a work carrier and a tool carrier, of mechanism for controlling relative movement between said carriers comprising a series of individual devices adapted to be intermittently rendered operative to cause predetermined relative movements between said carriers, and an automatic control mechanism including a control element movable to different locked positions under the control of and by relative movement between the carriers and being connected with said individually operated devices for causing, when moved to said various locked positions, said devices to be rendered operative in a predetermined manner.

45. In a multiple spindle lathe, the combination with a work carrier and a tool carrier, of mechanism for successively moving the tool carrier relatively to the work carrier in rapid approach, feed and reverse movements, including individual devices for effecting each of these movements, and an automatic control mechanism for governing the operation of said individual devices including a control member automatically movable to different locked positions in which to successively hold said individual devices in operative position for causing said rapid approach, feed and reverse movements.

46. In a multiple spindle lathe, the combination with a work carrier and a tool carrier movable toward and away from the work carrier, of mechanism for moving the tool carrier in rapid approach, feed and reverse movements with respect to said work carrier, including an automatic control device having a control member movable to different locked positions in which to effect said rapid approach, feed and reverse movements and being automatically actuated to cause such movements by operation of the work and tool carriers.

47. In a machine of the character described, the combination of a tool carrier and a work carrier, one of which is revoluble and one reciprocable with respect to the revoluble carrier, continuous rotating driving means, a driven member and means connecting the same with the reciprocable carrier for moving this carrier toward and from the revoluble carrier upon revolving said driven member in opposite directions, and a series of clutches between said driving means and driven member individually engageable to cause rapid approach, feed and reverse movements of the reciprocable carrier, and automatic control means for actuating said clutches and being in turn actuated by movement of the revoluble and reciprocable carriers.

48. In a machine of the character described, the combination of a tool carrier and a work carrier, one of which is revoluble and the other reciprocable with respect to the revoluble carrier, driving means, a driven member and connections therefrom to the reciprocable carrier for moving the same in opposite directions upon being similarly driven, connections between the driving means and driven member including a plurality of clutches individually engagable for revolving the driven member in opposite directions, means for indexing the revoluble carrier, and mechanism automatically put into operation by indexing movement of the revoluble carrier for engaging one of the clutches to effect approach of the tools and work and put into operation by movement of the reciprocable carrier to throw out the approach clutch and throw in the other clutch to thereby move the tools away from the work.

49. In a metal working machine, the combination of a work carrier and a tool carrier, one of which is movable toward and from the other, mechanism for so moving this carrier in rapid approach, feed and reverse movements, and automatic control mechanism for governing the operation of said carrier-moving mechanism including a series of shiftable devices for respectively effecting said rapid approach, feed and reverse movements, and a control member movable in opposite directions and connected with said individual devices for successively putting two of them into operation upon being moved in one direction and for putting the remaining device into operation upon being moved in the reverse direction.

50. In a machine of the character described, the combination of a work carrier and a tool carrier, means for moving the carriers relatively toward and from each other, and automatic control mechanism for operating said carrier-moving means comprising a series of individual devices adapted to be intermittently rendered operative for causing rapid approach, feed and reverse movements, a shiftable device having connection with said individual devices and being movable to a plurality of set positions in which to successively render said individual devices operative, and means operated in predetermined timed relation by movement of the work and tool carriers to cause said shifting device to be operated.

51. In a machine of the character described, the combination of a work carrier and a tool carrier relatively movable to bring the tools into and out of operation, means for so relatively moving said carriers comprising a member adapted to be driven in opposite directions to cause the tools to be moved into and out of operation, a single control member actuated in part by relative movement between the carriers, and mechanism adapted to be operated by said single control member for operating said driven member to successively effect rapid approach of the tools with respect to the work, feed movement of the tools during the cutting operation, and retracting of the tools.

52. In a machine of the character described, the combination of a work carrier and a tool carrier, one of which is reciprocable to bring the tools into and out of operation, mechanism for moving the reciprocable carrier including a plurality of clutches independently engageable to thereby cause the tools to be moved into and out of operation, a device movable to different set positions and having connection with said clutches by which to engage and disengage the same and to hold them separately engaged when in said set positions, and means actuated by movement of the reciprocable carrier for causing the clutch shifting device to be operated in a predetermined manner.

53. In a machine of the character described, the combination of a work carrier and a tool carrier, mechanism for moving the carriers relatively to bring the tools into and out of operation, comprising a series of individual devices respectively adapted to effect rapid approach, feed and reverse movements between said carriers, mechanism for rendering said individual devices operative and inoperative at predetermined intervals including a shifting device movable to different locked positions in which to respectively hold said individual devices in operation, and means for causing said shifting device to be automatically actuated in predetermined timed relation to cause said rapid approach, feed and reverse movements.

54. A machine of the character described, the combination of a work carrier and a tool carrier, one of which is reciprocable to bring the tools into and out of operation, mechanism for moving the reciprocable carrier including a plurality of clutches one of which is adapted to effect approach of the tools to the work and another retracting of the tools, a clutch shifting device, and means for actuating the same including means constantly urging the shifting devices in a direction to engage the tool retracting clutch, means for holding the clutch control means in a set position wherein the approach clutch is engaged, and means actuated by the reciprocable carrier at a predetermined point in its approach movement for releasing the control means for said set position, whereupon the clutch device will be automatically moved by said constantly urging means to engage the tool retracting clutch.

55. In a machine of the character described, the combination of a work carrier and a tool carrier, one of which is revoluble and the other reciprocable to bring the tools into and out of operation, mechanism for indexing the revoluble carrier, driving means, and automatic control mechanism for so moving the reciprocable carrier including independent clutches for establishing an operating connection between said driving means and the reciprocable carrier, a clutch shifting device, and means actuated by indexing and retracting movements of the carriers for automatically actuating said clutch shifting device to engage and disengage the clutches in predetermined timed relation.

56. In a machine of the character described, the combination of a work carrier and a tool carrier one of which is reciprocable to bring the tools into and out of operation, mechanism for moving the reciprocable carrier comprising a plurality of clutches adapted for respectively causing rapid approach, feed and retracting of the tools with respect to the work, a clutch shifting device, a control member having connection with the clutch shifting device, means for holding the control member in any of a plurality of locked positions wherein to hold said clutches separately engaged, and means for causing said control member to be automatically actuated at predetermined intervals in the movement of the reciprocable carrier to effect said rapid approach, feed and reverse movements.

57. A machine of the character described, the combination of a work carrier and a tool carrier, one of which is rotatable in step by step movements to different stations the other of which is reciprocable to bring the tools into and out of operation, mechanism for indexing the rotary carrier, mechanism for moving the reciprocable carrier including a plurality of individual devices adapted to be rendered operative and inoperative, one for effecting rapid approach of the tools, one for effecting feed movement thereof and one for effecting reverse movement of the tools, means for separately engaging said individual devices, means actuated by the reciprocable carrier at a predetermined point in its approach movement to disengage the approach device and engage the feed device and to subsequently disengage said feed device, means for engaging the reverse device at a predetermined period after disengagement of said feed device, and means actuated by the reciprocable carrier to put said indexing mechanism into operation at a predetermined point in the reverse movement of the reciprocable carrier.

58. In a machine of the character described, the combination of a tool carrier and a work carrier, and mechanism for relatively moving the carriers to bring the work into and out of operation including a control member movable to different set positions in which to cause different relative movements between said carriers, means for releasably holding said control member in said set positions, means for constantly urging the control member in one direction to move said member when it is released by said releasing means to thereby operate the control member, and means operated by movement of one of the carriers for actuating said releasing means at a predetermined point in the movement of said carrier.

59. In a machine of the character described, the combination of a tool carrier and a work carrier relatively movable to bring the tools into and out of operation, mechanism for relatively moving the carriers to produce rapid approach, feed and reverse movements including a control member movable in successive steps in one direction to effect the rapid approach and feed movements and movable in the opposite direction to effect the reverse movement, means for constantly urging said control member in one direction, and automatically controlled means for governing the movement of said control member as influenced by said constantly urging means and for moving said control member in the direction opposite to the pressure of said constantly urging means, whereby to cause said rapid approach, feed and reverse movements to be brought into effect in predetermined timed relation.

60. In a machine of the character described, the combination of a tool carrier and a work carrier, mechanism for relatively moving the carriers to successively cause rapid approach, feed and reverse movements thereof including a control member constantly urged in a direction to produce the reverse movement, and means for moving said control member in the opposite direction in step by step movements to successively produce the rapid approach and feed movements.

61. In a machine of the character described, the combination of a tool carrier and a work carrier, one of which is revoluble and the other reciprocable to bring the tools into and out of operation, mechanism for indexing the revoluble carrier, mechanism for moving the other carrier reciprocably to produce rapid approach, feed and reverse movements, an automatic control mechanism for moving the reciprocable carrier including a control member constantly urged in one direction to produce said reverse movement and movable in the opposite direction to successively cause said rapid approach and feed movements, and means actuated by indexing movement of the revoluble carrier for moving said control member to produce the rapid approach movement.

62. In a machine of the character described, the combination of a tool carrier and a work carrier, one of which is revoluble and the other reciprocable to bring the tools into and out of operation, mechanism for indexing the revoluble carrier, mechanism for moving the other carrier reciprocably to produce rapid approach, feed and reverse movements, automatic control mechanism for moving the reciprocable carrier including a control member constantly urged in one direction to produce said reverse movement and movable in the opposite direction to successively cause said rapid approach and feed movements, means actuated by indexing movement of the revoluble carrier for moving said control member to produce the rapid approach movement, and means operated by the reciprocable carrier at predetermined points in its approach movement to successively operate said control member to produce said feed movement and to allow said control member to be actuated by said constantly urging means to produce the reverse movement.

63. In a machine of the character described, the combination of a tool carrier and a work carrier, one of which is revoluble and the other reciprocable to bring the tools into and out of operation, mechanism for indexing the revoluble carrier, mechanism adapted for moving the reciprocable carrier in rapid approach, feed and reverse movements, and automatic control mechanism operable between the carrier reciprocating mechanism and the carriers and actuated by the latter in such manner that said rapid approach movement will be induced by the indexing movement of the revoluble carrier and said feed and reverse movements respectively will be induced by movement of the reciprocable carrier.

64. In a machine of the character described, the combination of a tool carrier and a work carrier, one of which is revoluble and the other reciprocable to bring the tools into and out of operation, mechanism for indexing the revoluble carrier, mechanism adapted for moving the reciprocable carrier in rapid approach, feed and reverse movements, and automatic control mechanism operable between the carriers and the mechanism for indexing and reciprocating the carriers and actuated by indexing movement of the revoluble carrier to induce said rapid approach movement and by movement of the reciprocable carrier to successively induce said feed and reverse movements and finally indexing of the revoluble carrier which has been stopped at some point in the rapid approach of the reciprocable carrier.

65. In a multiple spindle lathe, the combination of a revoluble work carrier and a tool carrier movable toward and away therefrom, mechanism for indexing the work carrier, and mechanism put into operation by indexing movement of the work carrier for moving the tool-carrier toward said work carrier.

66. In a multiple spindle lathe, the combination of a revoluble work carrier and a tool carrier, mechanism for indexing the work carrier, and mechanism for reciprocably moving the tool carrier relatively to the work carrier including a threaded shaft revoluble in opposite directions to produce similar movements of the tool carrier, said mechanism for reciprocating the tool carrier being controlled by movements of the work and tool carriers to produce rapid approach, feed and reverse movements of the tool carrier relatively to the work carrier.

67. In a multiple spindle lathe, the combination of a work carrier and a tool carrier, clutch-operated means for indexing one of the carriers and for reciprocating the other, and control means governing the clutch-operated means and being operated through indexing and reciprocating movements of the carriers to effect these movements in a predetermined manner.

68. In a lathe, the combination of a work carrier and a tool carrier, and mechanism for causing the carriers to be moved relatively to each other including clutch control means, and means actuated in a predetermined manner by movements of both carriers for operating the clutch control means.

69. In a multiple spindle lathe, the combination of a revoluble work carrier and a reciprocable tool carrier, mechanism for indexing and reciprocating the work and tool carriers respectively, and mechanical control means rendered operative by movements of the carriers to cause said mechanism to index and reciprocate the carriers in a predetermined manner.

70. In a multiple spindle lathe, the combination of a work carrier and a tool carrier, mechanism for indexing one of the carriers and for reciprocating the other and having individual clutches which when engaged will effect these movements, and means for controlling the clutches in a predetermined manner by movements of the work and tool carriers.

71. In a lathe, a work carrier and a tool carrier, mechanism for moving the tool carrier into and out of operation by means of separate clutches, and control means for operating the clutches and actuated by a spring pressure which is applied to disengage one clutch and to engage another, the control means having a lost motion during the initial operation under the influence of the spring pressure to effect a quick disengagement of said clutch.

72. The combination of three clutches and means for controlling the operation of the clutches including a shifting device movable in one direction to successively engage two of the clutches and movable in another direction to engage the third clutch.

73. The combination of a work carrier and a tool carrier movable relatively in rapid approach, feed and reverse movements, individual clutches for effecting these movements, and a clutch engaging device movable in one direction to successively engage two of the clutches and movable in the opposite direction to engage the other clutch.

74. The combination of a work carrier and a tool carrier relatively movable in rapid approach, feed and reverse movements, individual clutches for effecting these movements, and a clutch shifting device including means movable in one direction to engage two of the clutches and movable in the opposite direction to engage the other clutch.

75. The combination of a work carrier and a tool carrier relatively movable in rapid approach, feed and reverse movements, individual clutches for effecting these movements, and a clutch shifting device including means movable in one direction to successively engage the rapid approach clutch and the feed clutch and movable in the opposite direction to engage the reverse clutch.

76. In a multiple spindle lathe, the combination of a central column, a work carrier and a tool carrier mounted so that one of the carriers is rotatable about and the other reciprocable upon said central column, a member passing longitudinally through said central column and the rotatable carrier and coöperating with the reciprocable carrier for moving this carrier longitudinally of and upon said column, and means for operating said member to reciprocate said carrier.

77. The combination of a work carrier and a tool carrier, clutch-operated means for relatively moving the carriers to perform the cutting operation, and means operated under the influence of a spring pressure for disengaging the clutch controlling the feed movement and having a lost motion during its initial operation to thereby effect a striking impact and instantaneously disengage said clutch.

LEE G. DANIELS.